United States Patent
Yoo et al.

(10) Patent No.: US 8,718,154 B2
(45) Date of Patent: May 6, 2014

(54) MONITORING AND CORRECTING TIMING ERRORS IN WIRELESS COMMUNICATION

(75) Inventors: Taesang Yoo, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1005 days.

(21) Appl. No.: 12/620,866

(22) Filed: Nov. 18, 2009

(65) Prior Publication Data
US 2011/0116561 A1    May 19, 2011

(51) Int. Cl.
H04L 27/28    (2006.01)

(52) U.S. Cl.
USPC .......................................... 375/260

(58) Field of Classification Search
USPC .............................. 375/260; 370/69.1; 455/59
See application file for complete search history.

(56) References Cited

U.S. PATENT DOCUMENTS

| | | | | |
|---|---|---|---|---|
| 5,852,630 | A * | 12/1998 | Langberg et al. ............. | 375/219 |
| 7,027,530 | B2 * | 4/2006 | McFarland et al. ............ | 375/341 |
| 7,599,453 | B2 * | 10/2009 | Wilhelmsson ................ | 375/344 |
| 2001/0050926 | A1 * | 12/2001 | Kumar .......................... | 370/529 |
| 2005/0008088 | A1 * | 1/2005 | Liu et al. ........................ | 375/260 |
| 2005/0141657 | A1 * | 6/2005 | Maltsev et al. ................ | 375/346 |
| 2006/0093050 | A1 * | 5/2006 | Strait ............................. | 375/260 |
| 2008/0118012 | A1 * | 5/2008 | Corke et al. ................... | 375/348 |
| 2009/0161781 | A1 * | 6/2009 | Kolze ............................ | 375/260 |
| 2009/0323793 | A1 * | 12/2009 | Chang et al. .................. | 375/226 |
| 2010/0040043 | A1 * | 2/2010 | Li .................................. | 370/350 |
| 2010/0215007 | A1 * | 8/2010 | Zhang et al. .................. | 370/329 |
| 2011/0167321 | A1 * | 7/2011 | Hwang et al. ................. | 714/786 |
| 2013/0287003 | A1 * | 10/2013 | Kim et al. ...................... | 370/331 |

FOREIGN PATENT DOCUMENTS

| | | |
|---|---|---|
| EP | 1903728 A1 | 3/2008 |
| WO | WO2007051022 | 5/2007 |

OTHER PUBLICATIONS

Dah-Chung Chang: "Effect and Compensation of Symbol Timing Offset in OFDM Systems With Channel Interpolation", IEEE Transactions on Broadcasting, IEEE Service Center, Piscataway, NJ, US, vol. 52, No. 4, Dec. 1, 2008, pp. 761-770, XP011235653, ISSN: 0018-9316, DOI: DOI:10.1109/TBC.2008.2002339.
International Search Report and Written Opinion—PCT/US2010/057039—ISA/EPO—Apr. 21, 2011.
Thomas Keller, et al.,"Orthogonal Frequency Division Multiplex Synchronization Techniques for Frequency-Selective Fading Channels", IEEE Journal on Selected Areas in Communications, IEEE Service Center, Piscataway, US, vol. 19, No. 6, Jun. 2001, XP011055390, ISSN: 0733-8716, DOI: DOI:10.1109/49.932701.

* cited by examiner

*Primary Examiner* — Shuwang Liu
*Assistant Examiner* — Helene Tayong
(74) *Attorney, Agent, or Firm* — Linda G. Gunderson

(57) ABSTRACT

Providing for improved tracking and correction of timing in wireless communications is disclosed herein. By way of example, a first algorithm can be employed to track timing of a wireless signal, based on one dimension of the signal. Additionally, a second algorithm based on a different dimension of the signal can be employed to verify the timing and reduce errors in timing analysis. Various signal dimensions can be employed for the analysis, including cyclic prefix, frequency, channel impulse response, or the like, or a combination thereof. Additionally, different channels of the wireless signal can also be analyzed by the first algorithm and the second algorithm. Furthermore, the second algorithm can be selected to reduce deficiencies identified in the first algorithm, to improve overall timing analysis, reduce undetected timing errors or false errors, and improve timing correction.

37 Claims, 14 Drawing Sheets

MONITORING AND CORRECTING TIMING ERRORS IN WIRELESS COMMUNICATION

BACKGROUND

I. Field

The following relates generally to wireless communication, and more specifically to identifying and correcting timing errors in wireless communication signals.

II. Background

Wireless communication systems are widely deployed to provide various types of communication content and services such as, e.g., voice content, data content, video content, packet data services, broadcast services, messaging services, multimedia services, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via a single-in-single-out (SISO) system, a multiple-in-single-out (MISO) system, or a multiple-in-multiple-out (MIMO) system.

One aspect of providing reliable data exchange in wireless environments involves coordinating signal timing among remote transceivers. Because multiple-access communication systems involve concurrent transmissions, interference between transmitters can result. To counter wireless interference, signals are segmented into different resources, some resources employing different time slots, some resources employing orthogonal frequency bands or orthogonal spreading codes, and so on. In order for time division to be effective, however, transmitting and receiving devices typically must be synchronized in time. As an example, data scheduled for transmission in a particular time slot is expected to be received at a particular point in time by a receiver. If the receiver does not obtain the data when expected, an error might result in identifying the data from a transmission schedule (resulting in packet loss).

To mitigate timing problems, transceivers typically employ a default timing sequence(s) to synchronize remote devices in time. Signal transmission and responses to transmission are compared to the default timing sequence to identify time-based deviations in round-trip signaling. Based on the comparison, identified deviations in signal timing can be corrected.

Various mechanisms can be employed to analyze wireless signals and identify timing deviations. One mechanism is to analyze a particular wireless channel (e.g., predetermined set of signal resources), such as a reference signal, that is transmitted repeatedly by a wireless transceiver (e.g., base station, access point, relay, repeater, or the like). Thus, for instance, each time the reference signal is transmitted, a response to the reference signal is analyzed and timing compared with the default timing sequence. Errors can result with reference signal analysis, however, as with other analysis. Because timing errors can result in packet loss, which adds overhead and increases processing and power consumption, a goal of ongoing research in wireless communications is to reduce likelihood of timing errors in existing and future systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Providing for improved tracking and correction of timing in wireless communications is disclosed herein. In some aspects of the subject disclosure, a first algorithm is employed to track timing of a wireless signal, based on one dimension of the signal. Additionally, a second algorithm is employed to verify the timing and reduce errors in timing analysis. According to some aspects of the subject disclosure, various signal dimensions can be employed to analyze the timing, including cyclic prefix, frequency, channel impulse response, or the like, or a combination thereof. According to particular aspects, a different signal dimension is employed for the first algorithm and for the second algorithm. In at least one aspect, different channels of the wireless signal can also be analyzed by the first algorithm and the second algorithm. Results of the second algorithm can be utilized to verify signal timing, or to verify results of the first algorithm, as a secondary analysis. According to particular aspects, this secondary analysis can be given priority over results of the first algorithm, such that discrepancies in results of the first and second algorithms default to the priority analysis. In at least one particular aspect of the subject disclosure, involving a third generation partnership project (3GPP) long term evolution (LTE) system, the first algorithm analyzes channel impulse response of a reference signal that has a 45 kilohertz subcarrier spacing (KHz), and the second algorithm analyses frequency of a synchronization signal that has 15 KHz subcarrier spacing, to track timing of a wireless signal.

In some aspects of the subject disclosure, provided is a method for wireless communications. The method can comprise employing a data processor to execute a set of instructions. The set of instructions can comprise tracking a signal boundary of an orthogonal frequency division multiplex (OFDM) wireless signal with a tracking function that is based on a characteristic of the wireless signal. Moreover, the set of instructions can comprise verifying the signal boundary, or an output of the tracking function, with an additional function that is based on a different characteristic of the wireless signal. Furthermore, the method can comprise storing results of the tracking or the verifying in memory.

In other aspects of the subject disclosure, provided is an apparatus for wireless communications. The apparatus can comprise a data processor that executes a set of modules configured to track a signal dimension of a wireless signal. The set of modules can comprise a tracking module that employs a primary algorithm to monitor a signal boundary of the wireless signal. Additionally, the set of modules can comprise a verification module that employs a secondary algorithm to validate output of the primary algorithm, wherein the secondary algorithm and primary algorithm analyze different dimensions of the wireless signal. In addition to the foregoing, the apparatus can comprise a memory that stores output of the primary algorithm or secondary algorithm.

According to additional aspects, disclosed is an apparatus for wireless communications. The apparatus can comprise means for employing a data processor to execute a set of instructions. The set of instructions can comprise tracking a signal boundary of an OFDM wireless signal with a tracking function that is based on a characteristic of the wireless signal and verifying the signal boundary, or an output of the tracking function, with an additional function that is based on a different characteristic of the wireless signal. Further to the above, the apparatus can comprise means for storing results of the tracking or the verifying in memory.

In other aspects described herein, disclosed is at least one processor configured for wireless communications. The processor(s) can comprise a module for tracking a signal boundary of an OFDM wireless signal with a tracking function that is based on a characteristic of the wireless signal. Furthermore, the processor(s) can comprise an additional module for verifying the signal boundary, or an output of the tracking function, with an additional function that is based on a different characteristic of the wireless signal.

According to yet other aspects, disclosed is a computer program product comprising a computer-readable medium. The computer-readable medium can comprise a set of codes for causing a computer to track a signal boundary of an OFDM wireless signal with a tracking function that is based on a characteristic of the wireless signal. Moreover, the computer-readable medium can comprise a further set of codes for causing the computer to verify the signal boundary, or an output of the tracking function, with an additional function that is based on a different characteristic of the wireless signal.

In addition to the foregoing, the subject disclosure provides a method of facilitating wireless communications. The method can comprise employing an antenna and receiver to obtain and decode a wireless signal and output a decoded signal. Additionally, the method can comprise employing a data processor to execute the following instructions: selecting a dimension of the wireless signal to analyze the wireless signal, evaluating symbol boundary of the wireless signal based on a function of the selected signal dimension, verifying the evaluation with a function of a second dimension of the wireless signal, and correcting received signal timing if the evaluation or verification indicates a timing error.

In other disclosed aspects, provided is an apparatus for facilitating wireless communications. The apparatus can comprise a wireless antenna that receives a wireless signal and a receiver that decodes the wireless signal and outputs a decoded signal. Moreover, the apparatus can comprise a data processor that executes the following modules for analyzing the decoded signal: an analysis module that identifies an element of the wireless signal for evaluation of such signal and an execution module that employs an algorithm based on the identified element to calculate timing data of the wireless signal. Further, the apparatus can comprise a transmitter that submits the timing data to an access point of a serving wireless network to assist the serving wireless network in verifying timing for the wireless signal.

In at least one other aspect, provided is an apparatus for facilitating wireless communications. The apparatus can comprise means for employing an antenna and receiver to obtain and decode a wireless signal and output a decoded signal. Additionally, the apparatus can comprise means for employing a data processor to execute the following instructions: selecting a dimension of the wireless signal to analyze the wireless signal, evaluating symbol boundary of the wireless signal based on a function of the selected signal dimension, verifying the evaluation with a function of a second dimension of the wireless signal, and correcting received signal timing if the evaluation or verification indicates a timing error.

According to one or more other aspects of the subject disclosure, provided is at least one processor configured to facilitate wireless communications. The processor(s) can comprise a first module for obtaining and decoding a wireless signal and outputting a decoded signal. Additionally, the processor(s) can comprise a second module for selecting a dimension of the wireless signal to analyze the decoded signal and a third module for evaluating symbol boundary of the wireless signal based on a function of the selected signal dimension and verifying the evaluation with a function of a second dimension of the wireless signal. Further, the processor(s) can comprise a fourth module for correcting received signal timing if the evaluation or verification indicates a timing error.

In at least one additional aspect, disclosed is a computer program product comprising a computer-readable medium. The computer-readable medium can comprise a first set of codes for causing a computer to obtain and decode a wireless signal and output a decoded signal, and a second set of codes for causing the computer to select a dimension of the wireless signal to analyze the decoded signal. Moreover, the computer-readable medium can comprise a third set of codes for causing the computer to evaluate symbol boundary of the wireless signal based on a function of the selected signal dimension and verifying the evaluation with a function of a second dimension of the wireless signal. Further to the above, the computer-readable medium can comprise a fourth set of codes for causing the computer to correct received signal timing if the evaluation or verification indicates a timing error.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
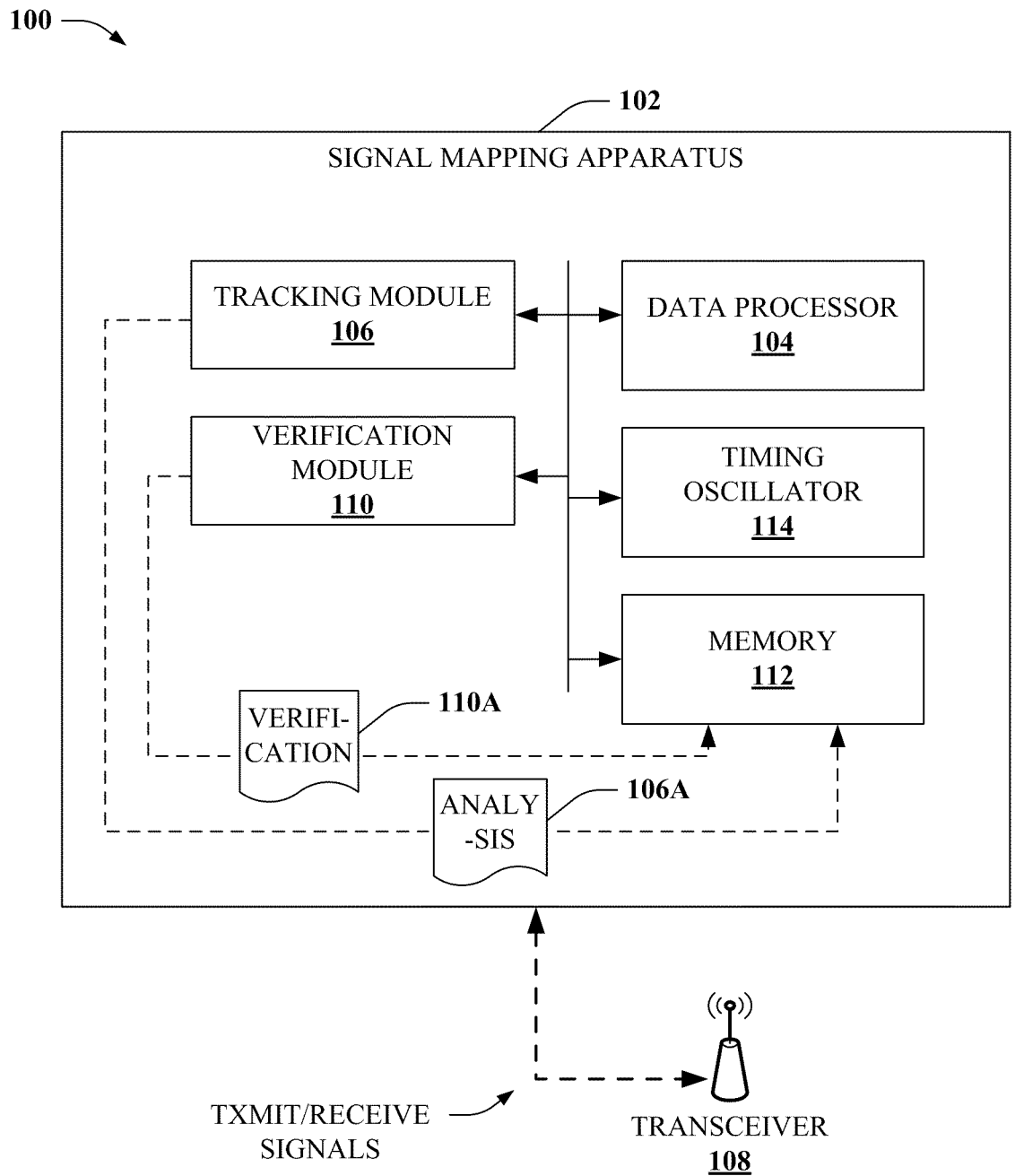
FIG. 1 illustrates a block diagram of an example system for identifying and correcting wireless communications timing errors in aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing cell-specific signal coding for reference signals in a wireless communication environment. One skilled in the art should appreciate that similar techniques could apply to other communication environments.

Wireless communication systems provide information exchange between wireless nodes by employing various signaling mechanisms. In one instance, a base station can be employed to transmit pilot signals that facilitate coordinated signaling. For instance, pilot signals can establish transmitter timing, identify a source of the signal and identify a network associated with the source, among other things. A remote wireless node, such as a user terminal (UT) or user equipment (UE), can decode the pilot signals to obtain information for identifying the base station as well as synchronizing timing with the base station. Properly decoding transmitted signals assumes adherence to predetermined signaling quality protocols, however, so that data transmitted by one device can be reliably received by another. In the absence of such an assumption, remote communication can become unreliable or break down altogether.

One protocol employed to effect reliable wireless communication is time standardization between a transmitter device and a receiver device. On a physical level, wireless signals (e.g., a modulated electromagnetic pulse, often in the radio frequency [RF] spectrum) are typically transmitted in bursts at distinct points in time and over distinct frequencies. Decoding the wireless signals involves demodulating a signal and mapping physical signals to coded data. Because a coding scheme is often dependent at least in part upon the point in time that pulses are transmitted (and received), properly decoding a signal is also dependent upon proper time synchronization between transmitting and receiving devices. However, because conditions that affect signal timing can change dynamically, devices typically synchronize timing periodically in order to detect and correct for changing conditions. Accordingly, employing wireless channels that receive regular signaling for time-based error detection can yield good results.

One mechanism for detecting timing errors includes analysis of pilot signals, reference signals (RSs), synchronization signals, or the like, which are transmitted repeatedly in a wireless environment. Such signals are employed by base stations to initiate communications with terminals, to deliver paging messages to idle terminals, and so on, and are typically transmitted at least once per time cycle, or even at least once per time sub-frame. Analysis of these types of signals can yield conditions that impact timing. Accordingly, by monitoring these types of signals over time, changes in wireless conditions that degrade time synchronization can be identified.

One example of time-based signal analysis is a time tracking loop (TTL) algorithm employed in orthogonal frequency division multiplex (OFDM) systems. Such an algorithm can analyze various signal dimensions to obtain timing information for a wireless signal. As one example, a cyclic prefix (CP) algorithm can be employed to obtain timing information by taking a cross-correlation of a CP and a replica thereof at the end of an OFDM symbol. As another example, a frequency analysis algorithm can be employed to determine phase differential between adjacent pilot tones to uncover timing information for the wireless signal. In yet another example, a time domain algorithm can be employed to estimate channel impulse response (CIR) of transmitted signals. Each of the foregoing example mechanisms has different benefits and drawbacks, however, depending on what channels those algorithms analyze, characteristics of those channels, what signal dimensions are measured, etc.

As a particular illustrative example, a time-based CIR estimation could be employed for third generation partnership project (3GPP) long term evolution (LTE) wireless communication systems. CIR estimation of periodic RS tones specified in LTE protocols can yield several benefits for timing analysis. For instance, CIR estimation is typically robust in a multipath environment. Furthermore, RS tones are regularly present in each subframe and have high energy density compared to other pilot channels available in LTE. Moreover, RS tones have a distinct signature for each cell, allowing robust performance at cell boundaries. CIR estimation in LTE does have some drawbacks as well, in that RS tones have limited pull-in range. In general terms, inadequate pull-in range as applied to signal timing can result in improperly identifying a boundary (beginning or end) of a segment of a signal (pull-in range is discussed in more detail infra, e.g., see FIG. 2). Thus, a pulse transmitted in a third OFDM symbol (time resource) may be improperly received in a second OFDM symbol (early timing) or fourth OFDM symbol (late timing), or the like, if timing synchronization between transmitter and receiver breaks down. In general, the larger the pull-in range, the more likely that signal timing is properly identified, the smaller the pull-in range, the more likely timing errors result.

Although pull-in range is one problem that occurs in signal analysis, other problems can occur as well. For instance, some signals providing better pull-in range might have relatively low energy density, exhibit poorer performance in multipath environments, be transmitted in less than all subframes, be difficult to distinguish across cell boundaries, and so on. Addressing these problems can result in improved timing analysis for wireless communications, resulting in reduced packet loss, less transmission redundancy, improved power consumption, and other benefits.

To take advantage of the foregoing benefits, the subject disclosure provides for improved detection and correction of timing errors in wireless communications, by employing a safe-net, or backup, for timing synchronization calculations. In some aspects of the subject disclosure, a plurality of timing algorithms is employed to detect timing errors. According to particular aspects, respective timing algorithms can be selected in order to offset relative deficiencies of individual algorithms. For instance, a primary algorithm can be employed for a particular wireless communication system, providing robust timing results based on characteristics of that system. Furthermore, a secondary algorithm can be selected that accounts for deficiencies in the primary algorithm. The secondary algorithm can be employed to provide additional timing analysis data, or to verify results of the primary algorithm. In at least one aspect of the subject disclosure, the primary algorithm can employ a CIR estimate of RS channels in an LTE system, while the secondary algorithm can employ a frequency analysis of secondary synchronization signal (SSS) tones of such a system. In such aspect(s), pull-in range errors of the CIR estimate are offset by the consecutive frequency implementation of SSS tones in LTE. This implementation enables the secondary algorithm to detect timing errors up to an entire OFDM symbol length. Furthermore, the frequency analysis of SSS tones can be implemented with minimal additional processing, providing a very robust reduction in timing error analysis and minimal cost in additional processing. According to particular aspects of the subject disclosure, discrepancies in the primary and secondary algorithms can be resolved by results of a default algorithm. Furthermore, in at least one aspect of the subject disclosure, the secondary algorithm can be executed at a remote terminal, and results of the algorithm can be provided to a serving access point for timing analysis.

Referring now to the drawings, FIG. 1 illustrates a block diagram of an example system 100 that provides improved timing synchronization in wireless communication according to aspects of the subject disclosure. System 100 comprises a signal mapping apparatus 102 that is configured to monitor signal timing and detect timing errors. Detected errors can be corrected based on output provided by signal mapping apparatus 102. Accordingly, signal mapping apparatus 102 can be utilized to maintain proper timing in wireless systems, and mitigate communication errors, packet loss and the like.

Signal mapping apparatus 102 can comprise a data processor 104 for executing a set of modules (106, 110) configured to detect wireless signal timing errors and to output error data, including error magnitude, error polarity (e.g., early or late, positive or negative, etc.), or error correction data. Data processor 104 can also implement error corrections calculated from output of the set of modules (106, 110). Error correction can comprise offsetting transmit or receive signal timing relative to a default or standard timing employed by a transceiver 108. The offset can be calculated based on differences in the default/standard timing and timing measurements conducted by signal mapping apparatus 102.

The set of modules executed by data processor 104 can comprise a tracking module 106 and a verification module 110. Tracking module 106 is configured to track signal boundaries (e.g., OFDM symbol boundary) of a wireless signal. Specifically, tracking module 106 employs a tracking function that is based on a characteristic of the wireless signal. As an example, the tracking function can comprise a cyclic prefix algorithm (CP algorithm) that cross-correlates symbol CPs transmitted by the wireless signal to establish transmission-response timing for wireless communication. As another example, the tracking function can comprise a frequency algorithm that employs frequency or phase differences in adjacent pilot tones to establish the transmission-response timing. In yet another example, the tracking function can employ a CIR estimate of pilot signal tones of the wireless signal to establish the timing. Furthermore, in at least one example, a combination of the foregoing functions can be employed by the tracking module 106.

Timing analysis results 106A of the foregoing tracking functions are output by tracking module 106 and stored in memory 112. In addition to the foregoing, data processor 104 can execute a verification module 110 to verify timing of the wireless signal analyzed by tracking module 106. Specifically, verification module 110 can employ a function to verify output 106A of the tracking function (e.g., by analyzing the results 106A), or to verify timing of the wireless signal itself (e.g., by again analyzing the transmit/receive signals). Furthermore, the function employed by verification module 110 can be based on different characteristics of the wireless signal than the tracking function discussed above. Accordingly, problems affecting results of the tracking function (e.g., poor energy density, pull-in range, multipath response, distinction at cell boundary, etc.) can be mitigated with the function employed by verification module 110. Timing verification results 110A are output by verification module 110 and stored in memory 112.

According to at least one aspect of the subject disclosure, redundancy in wireless signal timing analysis can be provided by a time-domain tracking function (e.g., generated by tracking module 106) and a frequency-domain verification function (e.g., generated by verification module 110). As described herein, the time-domain tracking function can estimate CIR of RS tones of a wireless signal. In an LTE system, for instance, the time-domain function will have a pull-in range of ~22.2 microseconds (or, e.g., +/−11.1 microseconds) due to 45 KHz spacing between adjacent RS tones in the LTE standard. (It should be appreciated, however, that other pull-in range errors in different wireless systems can result; the subject disclosure can be applicable to such systems, as described herein, or in a similar manner made known to one of skill in the art by way of the context provided by the subject disclosure.) To address this problem, the frequency-domain verification function can analyze SSS tones, which are contiguous in frequency per current LTE standard (see, for instance, 3GPP TS 36.211 version 8.5.0 [e.g., section 6.11.2], which is incorporated by reference herein in its entirety) to estimate CIR of RS tones of the wireless signal, in conjunction with a verification function that employs a low complexity frequency domain algorithm given by the following formula:

$$H[k]=Ae^{-j2\pi dk/N}$$

where H is the frequency response, A is a constant, k is a phase coefficient, and d is the delay in a single path channel. Thus, timing information of a signal having frequency response H can be obtained by solving for d. Furthermore, slope of the phase of the frequency response also depends upon delay d as follows:

$$H[k]H^*[k+1]=A^2e^{j2\pi d/\tilde{N}}$$

The frequency-domain verification algorithm can apply these formulas to multiple observable signal responses (e.g., from multiple SSS symbols, multiple SSS tones, multiple receive antennas, and so on) to mitigate noise or frequency selectivity in the response. The result of the algorithm will provide a measure of delay in signaling activity, which can be compared with a standard or default delay (e.g., established by timing oscillator 114) for a set of signals, symbols, tones, etc. The results are stored in memory 112 in verification file 110A.

Data processor 104 can execute one or more modules (not depicted, but see FIG. 4, infra) to identify or correct timing errors based on data provided by tracking module 106 or verification module 110. In one example, data processor 104 can compare timing results to a default or standard timing providing by a timing oscillator 114, which can comprise any suitable electronic or electro-mechanical mechanism for generating a pulsed stream at a frequency suitable for wireless communication timing (e.g., millisecond pulse, microsecond pulse, nanosecond pulse, etc.). Data processor 104 can attempt to correct identified errors based on an inferred magnitude thereof. Alternatively, data processor 104 can forward a correction factor (e.g., derived from the magnitude) to a source of a received wireless signal, to facilitate timing correction at the source.

Figure 2:
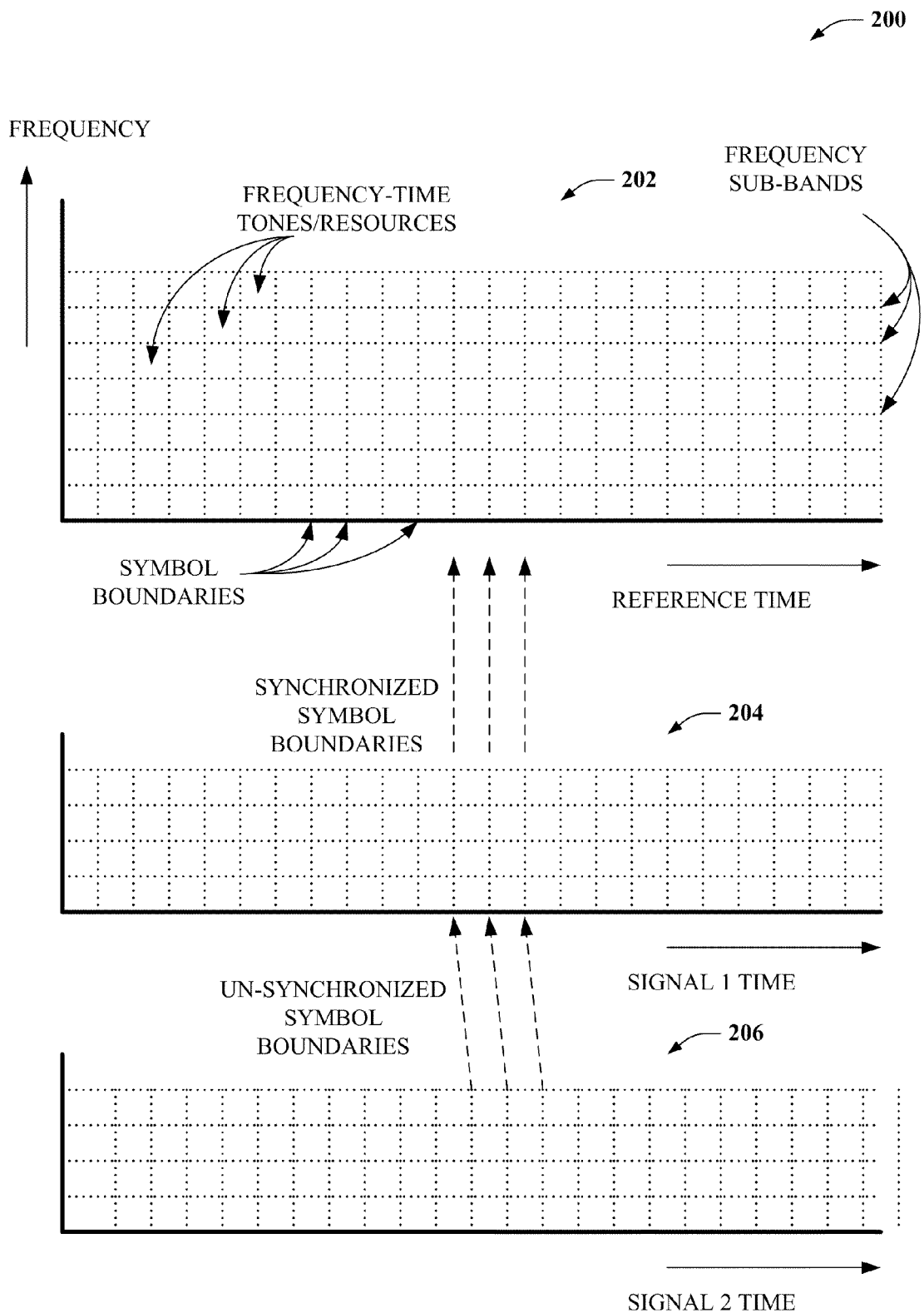
FIG. 2 depicts a block diagram of sample wireless signals showing synchronized and unsynchronized symbol timing according to particular aspects.

FIG. 2 illustrates a block diagram of example frequency-time graphs (202, 204, 206) representing resources of a wireless signal. Each graph 202, 204, 206 comprises a set of time divisions (e.g., OFDM symbol boundaries), denoted by vertical lines spaced along an 'x' axis of the respective graphs 202, 204, 206. Additionally, each graph 202, 204, 206 comprises a set of frequency divisions (e.g., frequency bands or tones) denoted by horizontal lines spaced along a 'y' axis of the graphs 202, 204, 206. Each block between time and frequency divisions of a graph is a single time-frequency resource (e.g., a tone), transmitted at a particular block of time, over a particular frequency.

Frequency-time graph 202 employs a standard or reference time sequence generated by a reference clock, e.g., such as timing oscillator 114 at FIG. 1, supra, and is also referred herein as reference graph 202. The reference time is displayed along the 'x' axis of graph 202. Frequency-time graph 204 corresponds to time-frequency resources of a first wireless signal, synchronized in time with the reference timing of reference graph 202. Frequency-time graph 204 is also referred to herein as synchronized graph 204. As depicted, the timing boundaries of synchronized graph 204 are aligned with the timing boundaries of reference graph 202. Thus, no timing correction to a wireless signal represented by synchronized graph 204 would be required.

Frequency-time graph 206 is a wireless signal resource graph depicting an offset in time or symbol boundaries relative to reference graph 202. Frequency-time graph 206 is also referred to as un-synchronized graph 206. If the degree of offset is such that resources/tones assigned to one time slot are indistinguishable from other time slots, wireless communication based on such a signal can break down. Accordingly, if the offset is greater than a threshold amount (e.g., where the threshold is a suitable fraction, ¼, ½, etc., of an OFDM symbol width, sub slot, or other time division), likelihood of timing errors increases, and correction can be required. Algorithms configured to detect and correct for timing errors therefore attempt to discern timing offsets as depicted by un-synchronized graph 206 relative to reference graph 202, and modify timing of an un-synchronized signal represented by un-synchronized graph 206. Some algorithms can also attempt to discern a magnitude or polarity/direction of the offset (e.g., early or late) and apply a correction corresponding to the identified magnitude and polarity. Some example algorithms designed to determine or infer an offset magnitude and polarity and apply a suitable correction are described herein (e.g., see FIG. 4, infra).

Figure 3:
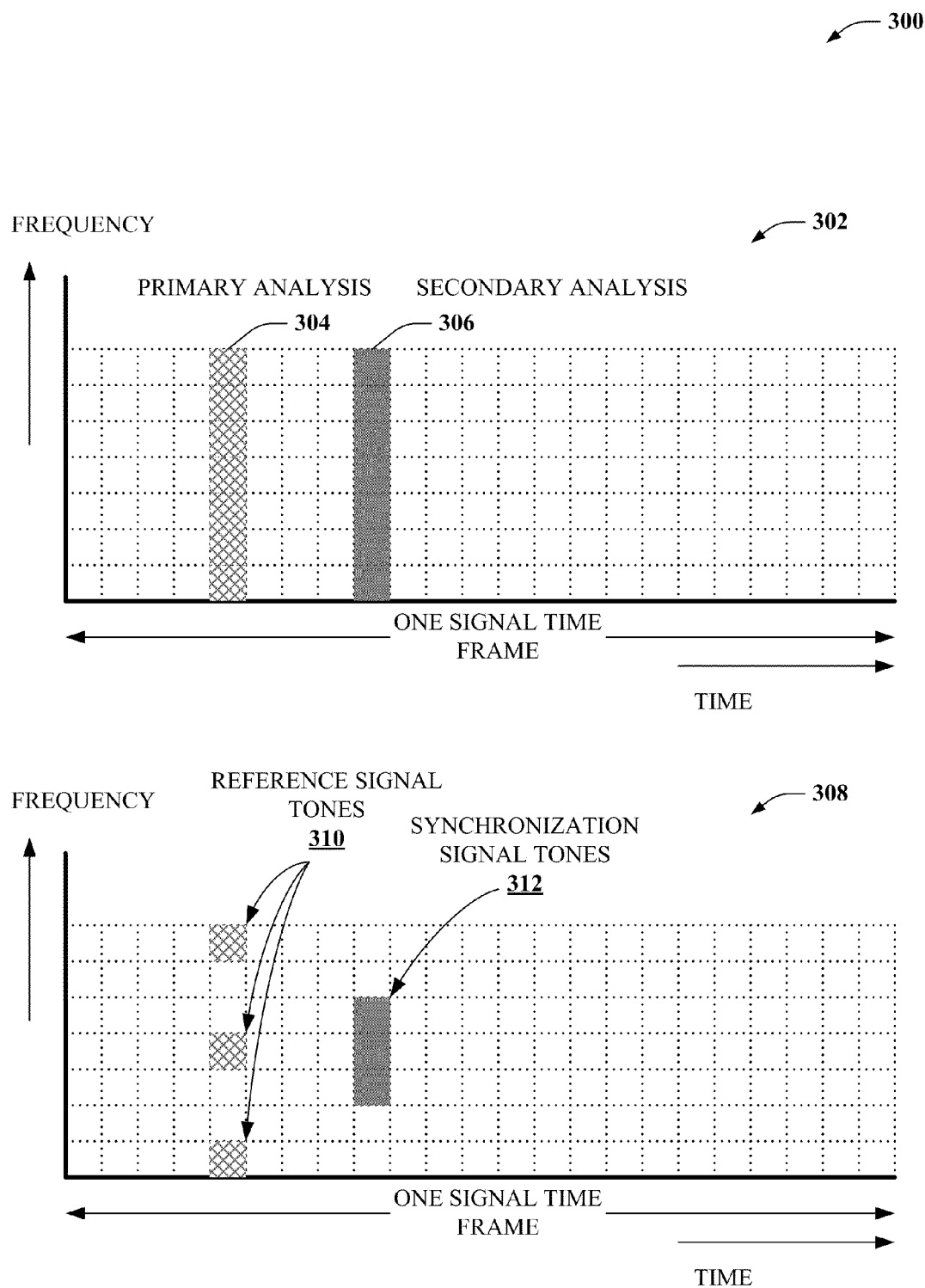
FIG. 3 illustrates a block diagram of example analysis of primary and secondary channels of a wireless signal according to further disclosed aspects.

FIG. 3 illustrates a block diagram 300 of example frequency-time graphs (302, 308) representing resources of respective wireless signals according to aspects of the subject disclosure. As described herein, timing detection or correction can be based on a set of algorithms for tracking and verifying signal timing. Additionally, the set of algorithms can employ different channels of the signal, and different analysis thereof, in order to compound advantages offered by individual analysis of individual channels.

Frequency-time graph 302 comprises a set of signaling channels 304, 306 assigned to specified time divisions of a signal associated with frequency-time graph 302 (also referred to as signal 302). It should be appreciated that, although channels 304, 306 are depicted as each being assigned to a single time division of signal 302, the channels 304, 306 can instead be assigned to a plurality of time divisions, and transmitted at various suitable frequencies. Furthermore, the channels 304, 306 can be repeated periodically, e.g., every 5 msec, 10 msec, or the like, as provided by a particular wireless communication standard (e.g., LTE, code division multiple access [CDMA], time division multiple access [TDMA], frequency division multiplex [FDM], and so on). Timing information can be analyzed utilizing various dimensions of signal 302, as described herein (e.g., cross-correlation of CP, frequency analysis, CIR estimation, and so forth). A dimension or characteristics of signal 302 can comprise time, frequency, cyclic prefix, or another suitable measurable characteristic of such signal (302). Furthermore, different analysis techniques can be applied to different channels 304, 306. As an example, a timing analysis technique based on CIR estimate can be applied to channel 304, and a frequency division technique analyzing phase difference in transmitted and received signals can be applied to channel 306. In at least some aspects of the subject disclosure, channels 304, 306 can be selected based on characteristics pertinent to timing analysis, such as energy density, frequency of channel repetition, performance in scattering or high interference environments, distinction at cell boundaries, etc.

Frequency-time graph 308 depicts resources of a wireless signal (also referred to as signal 308) comprising at least two channels 310, 312, a reference signal channel 310 and a synchronization signal channel 312. As depicted, the reference signal channel 310 comprises tones that span the frequency range of the signal, but have a spacing of multiple frequency bands. Although reference signals typically perform well in multipath environments, are regularly present in signal sub-frames in many wireless systems, have high energy density, and other benefits, the multiple frequency band spacing can result in a small pull-in range for timing approximation, leading to errors for timing delays outside the pull-in range.

As utilized herein, pull-in range refers to a range of possible signal dimension errors (e.g., timing error) that can still be resolved and corrected. Actual values of this pull-in range can often depend upon statistical probability that a particular error state is associated with a particular permitted state. As an illustrative example, consider a clock having twelve hour divisions, ranging from hours one through twelve. Assume that the clock has a reference time, which is a "correct" time for this clock. For any given correct time, eleven error states exist (e.g., if the correct time is hour twelve, the clock is in an error state or time offset if it shows current time to be hours one through eleven). However, because each time division is identical (one hour twelve is indistinguishable from another hour twelve; hour one today is indistinguishable from hour one tomorrow, and so on), a probability exists that the clock is offset because it is slow, and a corresponding probability exists that the clock is offset because it is fast. Pull-in range is related to the likelihood of correctly determining the magnitude of error (e.g., off by one hour, two hours, three hours, etc.), as well as the polarity (e.g., whether the clock is slow or fast). The greater the pull-in range the larger errors that can be corrected.

Turning again to wireless signal 308, relatively large pull-in errors can result, at least from some timing analysis techniques (e.g., time-based CIR estimates). To mitigate these errors, a secondary analysis can be conducted on synchronization channel tones 312 that are contiguous in frequency (the subject disclosure is not limited to channels that are contiguous in frequency, however; rather, any suitable channel having smaller frequency spacing than the reference signal channel 310 can help to resolve pull-in range errors). Although the synchronization channel tones 312 might not be desirable for primary timing analysis, because these tones (312) are allocated only to a relatively small portion of the frequency spectrum and can have low energy density in some circumstances, they provide a good external safe-net to analysis of reference tones 310. Specifically, analysis of the synchronization channel 312 can resolve errors outside the pull-in range of the reference signal tones 310, reducing overall timing errors. Systems based on this configuration can provide substantial improvements in wireless communications, reducing transmission errors, error feedback signaling, and so forth.

Figure 4:
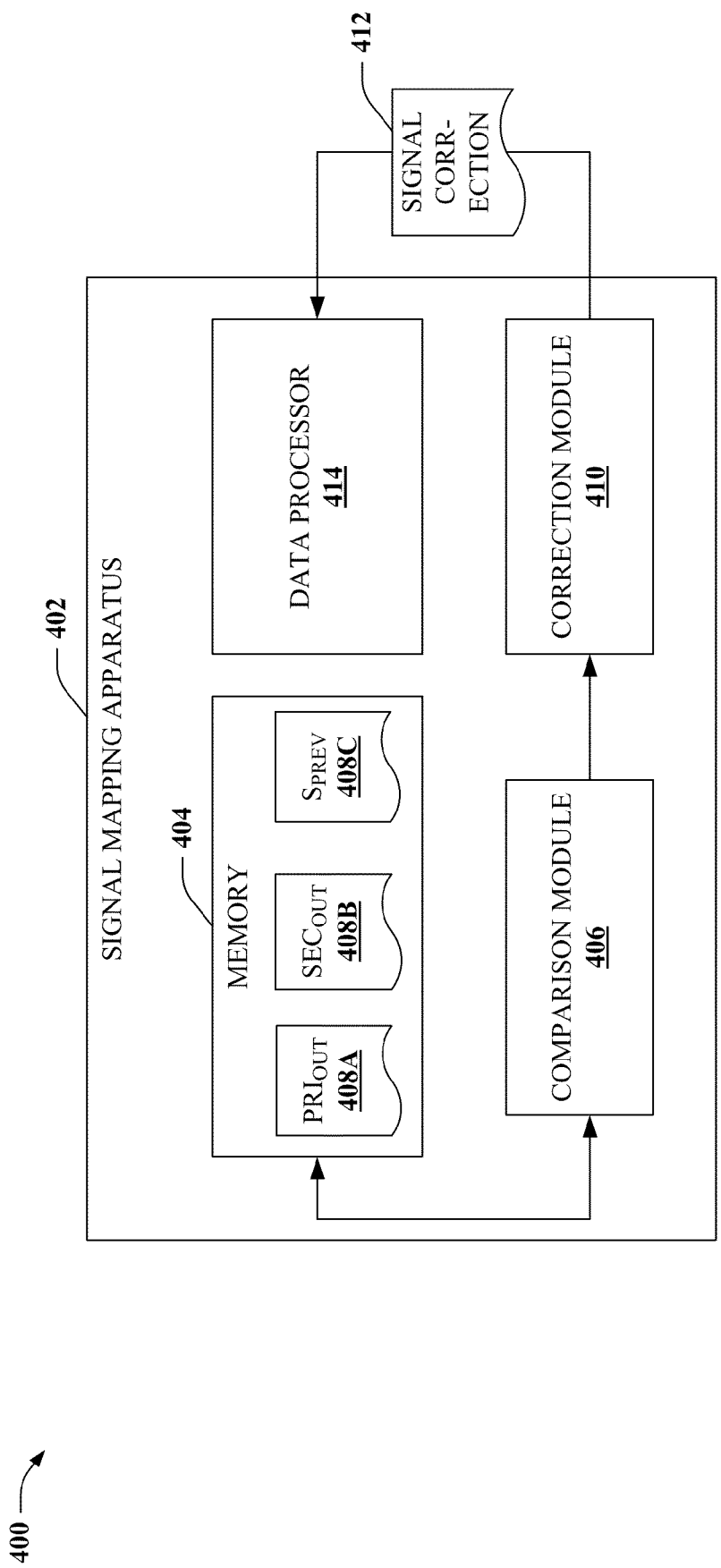
FIG. 4 depicts a block diagram of a sample system for correcting identified timing errors according to further aspects.

FIG. 4 illustrates a block diagram of an example system 400 for correcting timing errors in wireless communications according to aspects of the subject disclosure. System 400 comprises a signal mapping apparatus 402 configured to detect and correct wireless signal timing errors. Output from a set of signal analysis modules (e.g., see FIG. 1, supra), specifying data relevant to such wireless signal timing errors, can be saved in memory 404. The output can be provided to a comparison module 406, for determining a magnitude of timing error, and a corrections module 410 for identifying a suitable signal correction 412. A data processor 414 can be employed to apply the signal correction 412 to a wireless signal, or forward the signal correction or a correction factor to a source of the wireless signal for correction at the source.

Comparison module 406 evaluates output of the signal analysis modules (e.g., output of a primary or secondary algorithm) with respect to a default signal boundary. This evaluation can be utilized in determining accuracy of the signal dimension. As a specific example, comparison module 406 can obtain data (408A, 408B) representing timing analysis results of a wireless signal, as well as data (408C) representing a reference or default time for that signal. Error analysis can comprise relating the timing analysis results with the reference timing data. In some aspects of the subject disclosure, memory 404 comprises a set of files 408A, 408B for storing a set of timing analysis results, as well as at least one file 408C for storing the reference time data. In at least one aspect, the set of files 408A, 408B comprises a primary analysis output file $PRI_{OUT}$ 408A and a secondary analysis output file $SEC_{OUT}$ 408B, corresponding to primary and secondary timing analysis mechanisms, as described herein. In another aspect, the reference time data 408C can comprise signal timing data pertaining to a previous clock cycle of the signal $S_{PREV}$.

In addition to identifying timing errors, comparison module 406 can infer a polarity thereof from analysis output data (408A, 408B) or a relationship of such data with the reference timing 408C. To reduce effects of signal interference, multi-path scattering, as well as statistical anomalies resulting from error analysis, comparison module 406 can analyze timing and reference data over a set of multiple channel tones, over a set of receive antennas, or the like. For instance, summation, averaging, or other statistical mitigation techniques can be employed to reduce signal anomalies, as described in more detail below. Based on the analysis conducted by comparison module 406, corrections module 410 can adjust a signal dimension of the analyzed wireless signal. Specifically, the adjustment can be in accordance with output of a primary algorithm and secondary algorithm that analyze different dimensions, characteristics, elements, etc. of the wireless signal, as described herein. Optionally, corrections module 410 can forward data indicative of the adjustment to a source of the wireless signal (e.g., a base station or network access point). In one example aspect, corrections module 410 does not make a signal timing adjustment to the analyzed wireless signal, but instead forwards the data indicative of the adjustment to the source, for correction of the wireless signal at the source.

One specific example of the above frequency algorithm applied to an LTE system is now described. It should be appreciated that this example is illustrative, and not to be construed as limiting the scope of the subject disclosure to the specific aspects articulated herein. In an LTE system, a frequency-based timing analysis algorithm can be dependent on cyclic prefix (CP). Based on results of this algorithm, comparison module 406 can make an inference as to whether a signal is late or early in time. For short CP, the algorithm extracts SSS tones (e.g., 62 tones every 5 milliseconds), de-rotates by SSS sequence, and calculates timing output S, wherein S is given by:

$$S = \sum_{OverRx\ antennas} \sum_{Over.\ SSCs} \left( \sum_{k=-30}^{-1} Y[k-1]Y^*[k] + \sum_{k=1}^{30} Y[k]Y^*[k+1] \right) =$$

$$Ke^{j2\pi d} + \text{(noise and product terms)}$$

$$\Delta u_{raw} = \Box S = d \approx \begin{cases} 0 & \ldots \text{ (correct } \ldots \text{ time)} \\ 2\pi/3 & \ldots \text{ (early } \ldots \text{ time)} \\ -2\pi/3 & \ldots \text{ (late } \ldots \text{ time)} \end{cases}$$

where $\Box S$ gives output between $[-\pi, \pi]$. The results, $\Delta u_{raw}$, can be generated by comparison component 406 based on the above defined equalities, or a like set of equalities. Furthermore, a signal timing correction 412 can be inferred by correction module 410 based on the equality defined below, or similar equalities:

$$\Delta u = \begin{cases} 0, & \text{if } -\pi/3 \leq \Delta u_{raw} \leq \pi/3 \ldots \text{ (correct } \ldots \text{ time)} \\ 2\pi/3, & \text{if } \ldots \pi/3 < \Delta u_{raw} \ldots \text{ (early } \ldots \text{ time; } \ldots 22 u\text{sec)} \\ -2\pi/3, & \text{if } \ldots \Delta u_{raw} < -\pi/3 \ldots \text{ (late } \ldots \text{ time; } \ldots -22 u\text{sec)} \end{cases}$$

thus, for normal CP according to the present example, output provided by the correction module 410 will be one of the set of Δu={0, 22 usec, -22 usec}. Additionally, Δu can be averaged over multiple SSS symbols to mitigate false polarity determinations. For instance, averaging over eight SSS symbols can significantly reduce false error determinations. For instance, averaging over eight SSS symbols provides low likelihood of false error or false polarity determination. Additionally, it should be appreciated that the eight SSS symbols can be obtained from any suitable combination of SSS symbols received per cycle, and per copy of a signal received (e.g., at multiple receive antennas). As a particular example of the foregoing, analyzing four SSS symbols over a 20 msec span for each of a pair of received signals could provide the eight symbol averaging discussed above.

To continue the foregoing example for long CP, a variation of the above algorithm can be employed that results in timing correction output 412 of Δu=(0, +11 usec, +22 Usec, -11 Usec, -22 usec). In such a variation, S and $\Delta u_{raw}$ can be calculated in a same or similar manner as per the short CP example described above. The timing correction Δu can be calculated by correction module 410 to provide the above or a similar output. In one example, the following definitions can be employed by correction module 410 for Δu:

$$\Delta u = \begin{cases} -2\pi/3, & \text{if } \ldots \Delta u_{raw} < -\pi/2 \ldots \text{(late} \ldots \text{time;} \ldots -22u\text{sec)} \\ -\pi/3, & \text{if } \ldots -\pi/2 \le \Delta u_{raw} < -\pi/6 \ldots \text{(half} \ldots \text{late} \ldots \text{time;} \ldots -11u\text{sec)} \\ 0, & \text{if } \ldots -\pi/6 \le \Delta u_{raw} \le \pi/6 \ldots \text{(correct} \ldots \text{time;} \ldots 0u\text{sec)} \\ \pi/3, & \text{if } \ldots \pi/6 < \Delta u_{raw} \le \pi/2 \ldots \text{(half} \ldots \text{early} \ldots \text{time;} \ldots +11u\text{sec)} \\ 2\pi/3, & \text{if } \ldots \pi/2 < \Delta u_{raw} \ldots \text{(early} \ldots \text{time;} \ldots 22u\text{sec)} \end{cases}$$

Similar to the above, results for long CP can be stored in signal correction file 412, which can be implemented by data processor 414.

It should be appreciated that the foregoing algorithms are exemplary, and not to be construed as limiting the subject disclosure. Rather, various other algorithms known to one of skill in the art or made known to one of skill in the art by way of the context provided herein are incorporated as part of the subject disclosure.

Figure 5:
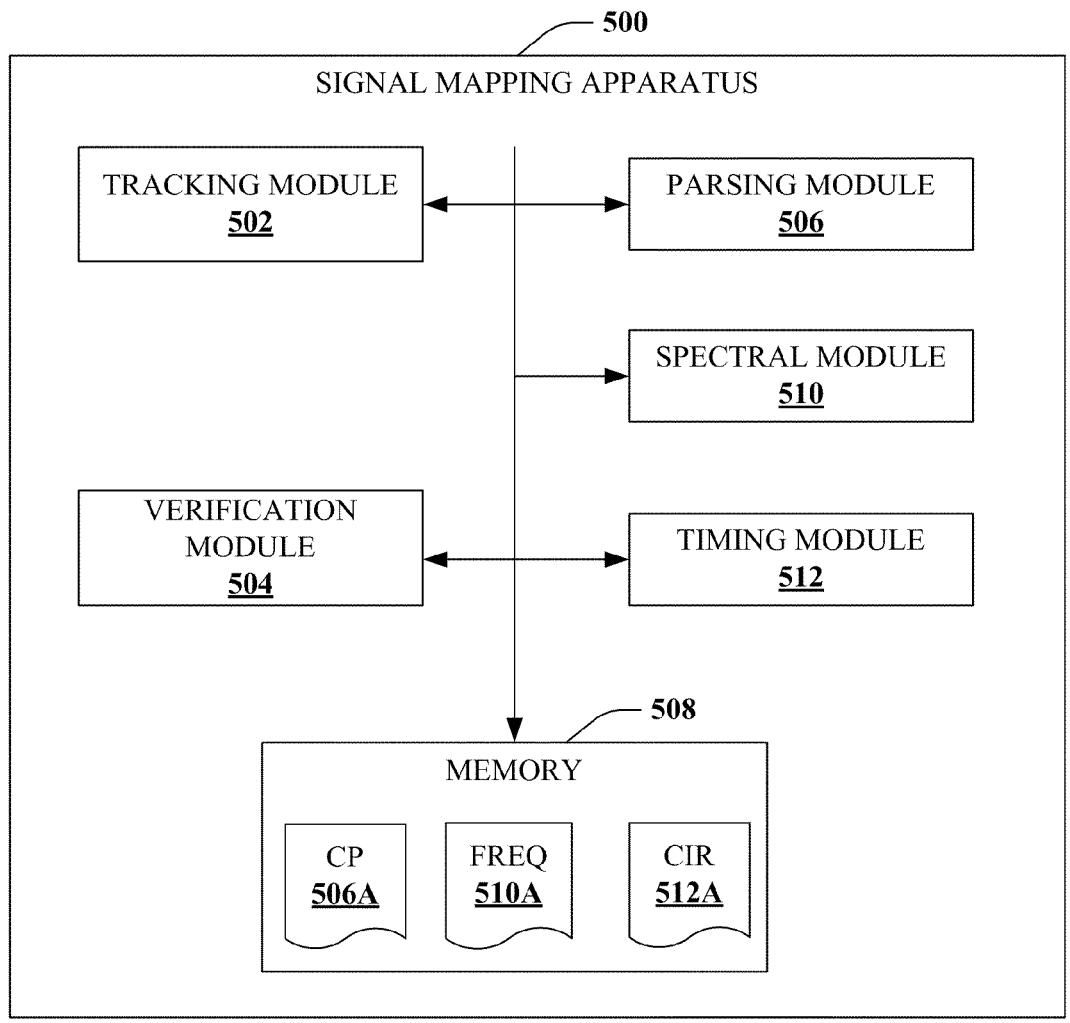
FIG. 5 depicts a block diagram of an example system that analyzes various dimensions of a wireless signal to provide timing analysis.

FIG. 5 illustrates a block diagram of an example signal mapping apparatus 500 according to further aspects of the subject disclosure. Signal mapping apparatus 500 can comprise a set of modules (e.g., tracking module 502, verification module 504) providing redundancy for timing calculations for wireless communications. Furthermore, the timing calculation modules 502, 504 can employ a set of signal analysis modules (506, 510, 512) to analyze different dimensions of a wireless signal to obtain timing information for the signal. Signal dimensions can include CP, frequency of the signal, or time boundary (e.g., symbol boundary) of the signal, or the like. The timing calculation modules 502, 504 can select a particular signal analysis module 506, 510, 512 based on prevailing wireless conditions. For instance, where multipath scattering is high, channels resistant to scattering can be analyzed. As another example, CP analysis can be utilized instead of time-based CIR analysis, etc. Further to the above, the respective timing calculation modules 502, 504 can employ different analysis modules 506, 510, 512 to overcome deficiencies of a particular type of analysis. For instance, where tracking module 502 analyzes a channel with low energy density, verification module 504 can select a channel with high energy density, instead. The scope of the subject disclosure is not limited to the foregoing articulated example, however.

According to particular aspects of the subject disclosure, the set of analysis modules 506, 510, 512 can comprise a series parsing module 506, a spectral module 510, and a timing module 512. Parsing module 506 can be employed to cross-correlate a CP with a replica thereof at the end of an OFDM symbol to determine delay in transmit/receive timing for the signal. CP-based delay is saved in a CP file 506A in memory 508. Furthermore, a spectral analysis module 510 can be employed to evaluate differential phase conditions between pilot tones, RS tones, or other suitable tones of the wireless signal to determine the delay in timing information (e.g., as described at FIG. 4, supra). Frequency-based timing information can be saved in a frequency file 510A. Additionally, a timing module 512 can be employed to perform a CIR estimate of transmitted and received signals to obtain relative delay in timing information of a signal. Timing information provided by timing module 512 is stored in a CIR file 512A at memory 508. Data stored in memory 508 can be supplied to additional modules (not depicted) for identifying errors from the timing information, and implementing error correction to preserve time-based synchronization of wireless communication signals.

Figure 6:
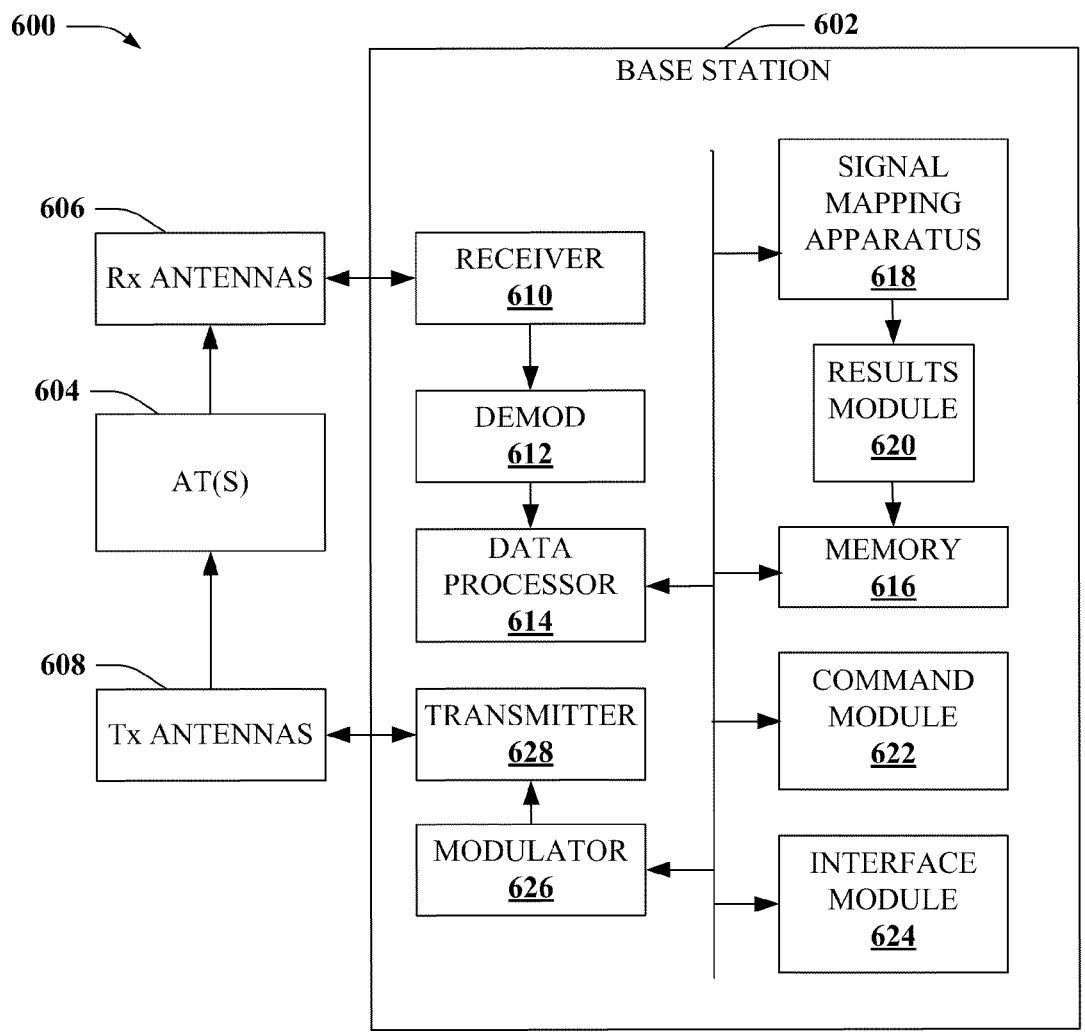
FIG. 6 depicts a block diagram of an example base station configured for timing analysis according to aspects of the subject disclosure.

FIG. 6 depicts a block diagram of a sample system 600 comprising a wireless base station 602 configured for aspects of the subject disclosure. Specifically, system 600 can comprise a base station 602 that employs redundant analysis to improve timing correction in wireless communications conducted by the base station 602. Furthermore, the processing can be configured to accommodate for identified shortcomings in singular timing analysis. Accordingly, base station 602 provides improved reliability in communications, by reducing undetected timing errors, or false timing errors, and so on.

Base station 602 (e.g., access point, ...) can comprise a receiver 610 that obtains wireless signals from one or more of ATs 604 through one or more receive antennas 606, and a transmitter 628 that sends coded/modulated wireless signals provided by modulator 626 to the AT(s) 604 through a transmit antenna(s) 608. Receiver 610 can obtain information from receive antennas 606 and can further comprise a signal recipient (not shown) that receives uplink data transmitted by AT(s) 604. Additionally, receiver 610 is operatively associated with a demodulator 612 that demodulates received information. Demodulated symbols are analyzed by a data processor 614. Data processor 614 is coupled to a memory 616 that stores information related to functions provided or implemented by base station 602. In one instance, stored information can comprise timing data generated as a result of the redundant analysis employed by base station 602. The data can be employed to identify and correct signal timing errors. In addition to the foregoing, memory 616 can comprise rules or protocols for sending secondary timing analysis to one or more ATs 604. Such analysis can be conducted at ATs 604, and results transmitted back to base station 602 for integration with primary analysis timing analysis conducted at base station 602, as described herein.

Base station 602 comprises a signal mapping apparatus 618 that monitors wireless signals transmitted and received by base station 602 and synchronizes signal timing with a reference signal. Specifically, signal mapping apparatus 618 can employ a set of algorithms for the analysis. In at least some aspects of the subject disclosure, the set of algorithms can employ different dimensions of wireless signals to obtain timing information. Furthermore, respective algorithms of the set can select signal dimensions or analysis techniques that complement analysis of other algorithms of the set. For instance, one algorithm can employ an analysis technique that corrects a deficiency of another algorithm of the set. Signal mapping apparatus can employ timing information obtained by the set of algorithms to identify timing errors in a current signal, as compared with a previous signal, or a reference time. Identified errors can be corrected as described herein.

A results module 620 can save timing information provided by signal mapping apparatus 618 in memory 616. Information derived from different algorithms or different signal dimensions can be saved in distinct files. Thus, results module 620 can output data generated by a primary signal analysis algorithm in one file, and output data generated by a secondary algorithm (that indicates whether the primary algorithm reports accurate or inaccurate timing, as described herein) in a second file. Furthermore, information derived from different symbols or signal boundaries can also be saved in distinct files. Additionally, timing corrections applied to a wireless signal can be saved in a timing log (not depicted) in memory 616. In an example aspect, results module 620 outputs a different set of output data for a secondary algorithm as compared with a primary algorithm. The different set of output data can be utilized to verify an output of the primary algorithm. Furthermore, for a normal cyclic prefix wireless signal, the output data of the secondary or primary algorithm indicates an offset in OFDM symbol boundary. Alternatively, the output data can indicate varying degrees of offset in OFDM symbol boundary (e.g., long or short offset) for extended cyclic prefix wireless signal.

In at least one aspect of the subject disclosure, base station 602 can comprise a command module 622 that initiates an order instructing one or more AT(s) 604 to conduct timing analysis on a received or transmitted signal. The order can specify a type of algorithm to be employed for the analysis, or a signal dimension to analyze (e.g., CP, frequency, timing). The order is transmitted by an interface module 624 to the AT(s) 604. Additionally, interface module 624 can be configured to monitor data received at base station 602, and identify timing data submitted by AT(s) 604 in response to the order. Such timing data can be saved in memory 616, and accessed by signal mapping apparatus 618 to identify or correct timing errors.

Figure 7:
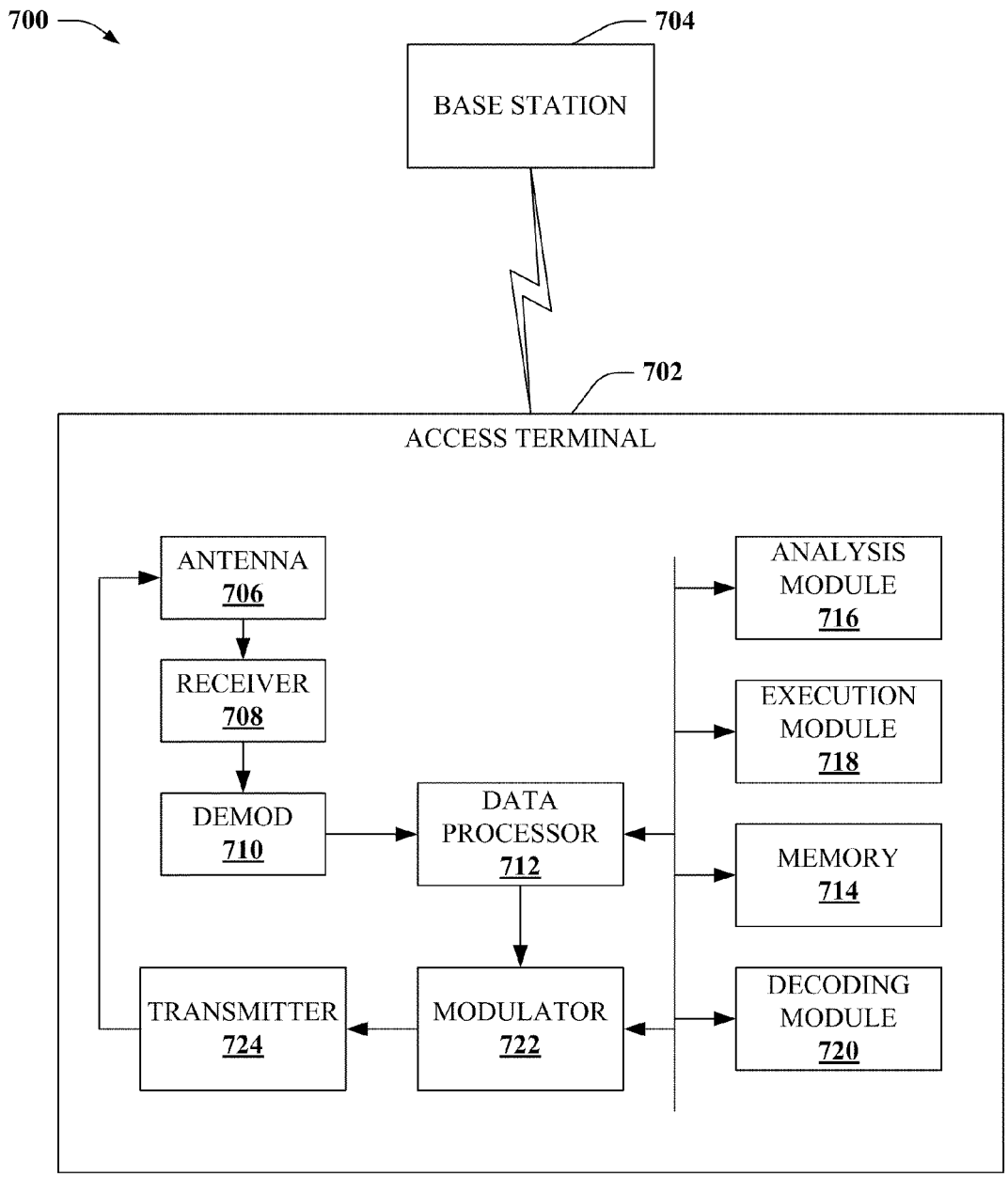
FIG. 7 illustrates a block diagram of an example user equipment configured to facilitate verification of timing analysis conducted at a base station.

FIG. 7 depicts a block diagram of an example system 700 comprising an AT 702 configured for wireless communication according to aspects of the subject disclosure. AT 702 can be configured to wirelessly communicate with one or more base stations 704 (e.g., access point) of a wireless network. Based on such configuration, AT 702 can receive wireless signals from a base station (704) on a forward link channel and respond with wireless signals on a reverse link channel. In addition, AT 702 can comprise instructions stored in memory 714 for analyzing received wireless signals, specifically, for calculating timing information for transmitted or received wireless signals, or the like, as described herein.

AT 702 includes at least one antenna 706 (e.g., a wireless transmission/reception interface or group of such interfaces comprising an input/output interface) that receives a signal and receiver(s) 708, which perform typical actions (e.g., filters, amplifies, down-converts, etc.) on the received signal. In general, antenna 706 and a transmitter 730 (collectively referred to as a transceiver) can be configured to facilitate wireless data exchange with base station(s) 704.

Antenna 706 and receiver(s) 708 can also be coupled with a demodulator 710 that can demodulate received symbols and provide such signals to a data processor(s) 712 for evaluation. It should be appreciated that data processor(s) 712 can control and/or reference one or more components (706, 708, 710, 714, 716, 718, 720, 722, 724) of AT 702. Further, data processor(s) 712 can execute one or more modules, applications, engines, or the like (716, 718, 720) that comprise information or controls pertinent to executing functions of the AT 702. For instance, such functions can include receiving and decoding wireless signals, coding and transmitting wireless signals, analyzing wireless signals to extract timing information, submitting timing information to base station 704, or the like.

Additionally, memory 714 of AT 702 is operatively coupled to data processor(s) 712. Memory 714 can store data to be transmitted, received, and the like, and instructions suitable to conduct wireless communication with a remote device (704). Specifically, the instructions can be utilized to implement the various functions described above, or elsewhere herein. Further, memory 714 can store the modules, applications, engines, etc. (716, 718, 720) executed by data processor(s) 712, above.

According to particular aspects of the subject disclosure, AT 702 can comprise an analysis module 716 that identifies an element of a received or transmitted wireless signal for evaluating aspects of the signal. To identify the element, analysis module 716 can employ a decoding module 720 to extract analysis instructions from an order sent by base station 704. Such instructions can specify an algorithm with which to analyze the signal, or a dimension of the signal for the analysis (e.g., time, frequency, etc.), or the like. Additionally, an execution module 718 can be employed to calculate timing data pertaining to the wireless signal by initiating an algorithm based on the identified element. In one aspect, the timing data comprises an OFDM symbol boundary, and the algorithm is a frequency-based analysis of a synchronization channel of the wireless signal. Furthermore, the frequency-based analysis can be employed to detect timing errors larger than pull-in range limitations of timing functions employed by a source of the wireless signal (e.g., base station 702). It should be appreciated that in other aspects, the identified element can be a frequency, time, or cyclic prefix element of the wireless signal. Results of the calculation are coded and transmitted by AT 704 to base station 702 for correction of timing errors, as described herein.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include AT 702, base station 602, and signal mapping apparatus 500, or a different combination of these or other modules. Sub-modules could also be implemented as modules communicatively coupled to other modules rather than included within parent modules. Additionally, it should be noted that one or more modules could be combined into a single module providing aggregate functionality. For instance, tracking module 502 can include verification module 504, or vice versa, to facilitate analyzing wireless signal timing information and verifying the analysis by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 8:
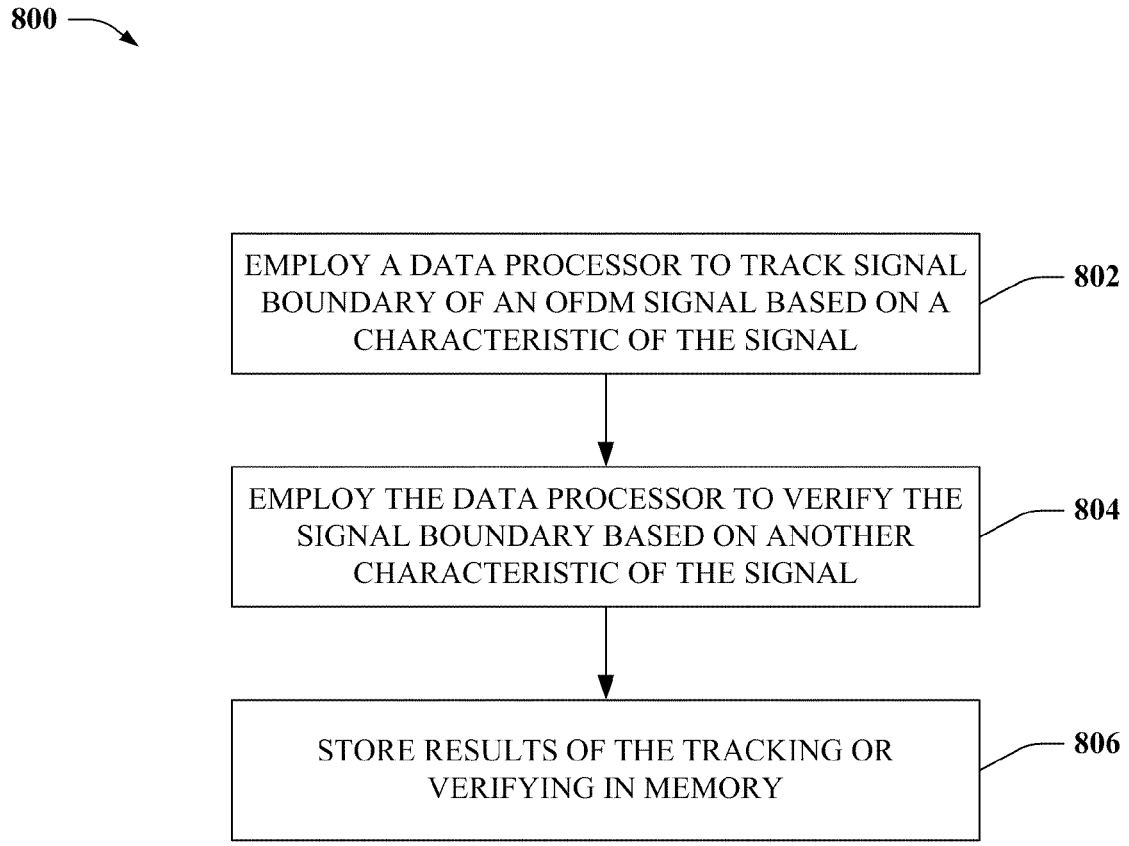
FIG. 8 depicts a flowchart of a sample methodology for identifying timing errors in wireless communications according to aspects of the subject disclosure.
Figure 9:
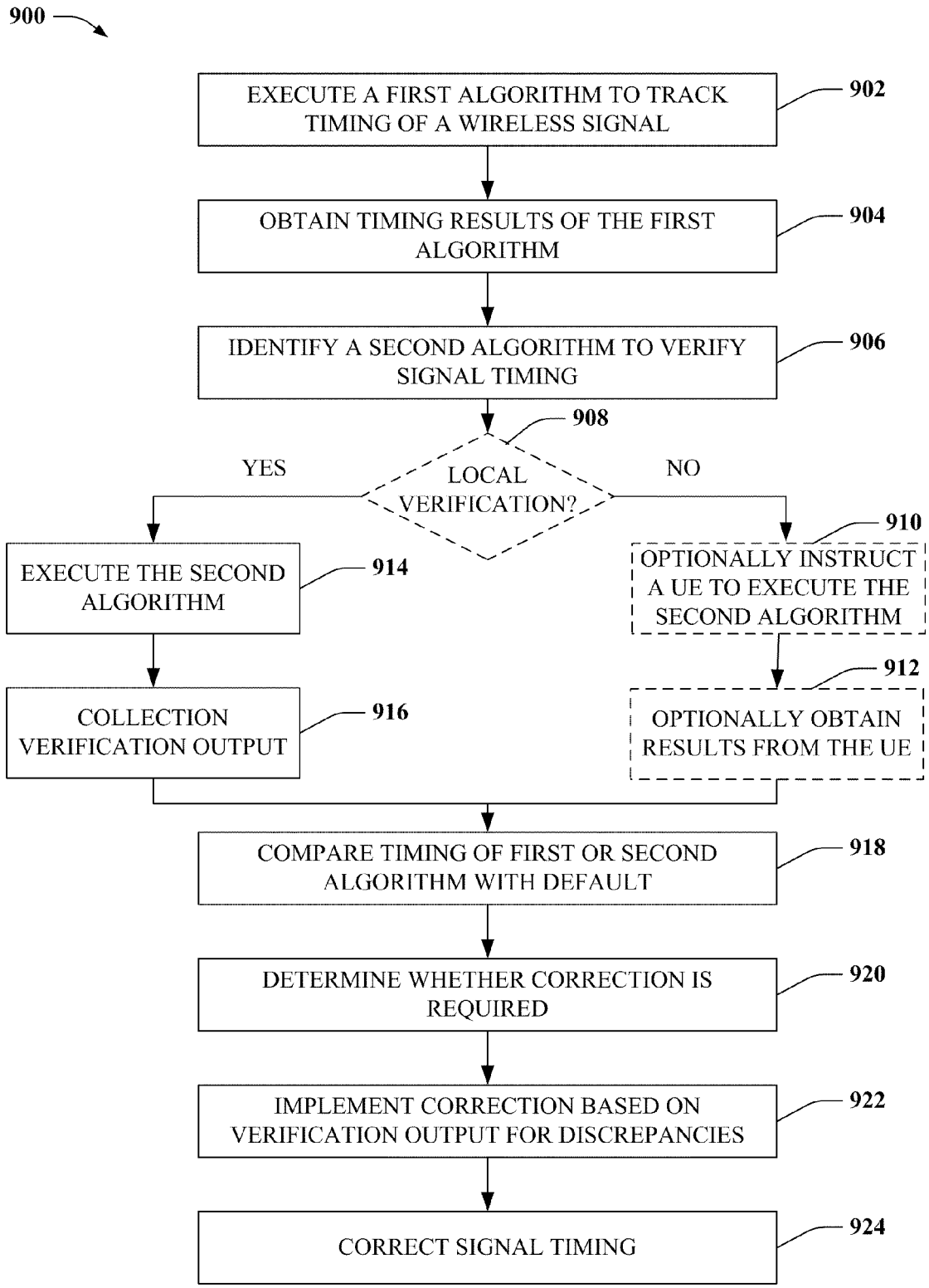
FIG. 9 illustrates a flowchart of an example methodology for employing multiple analyses of a wireless signal to determine signal timing in further aspects.
Figure 10:
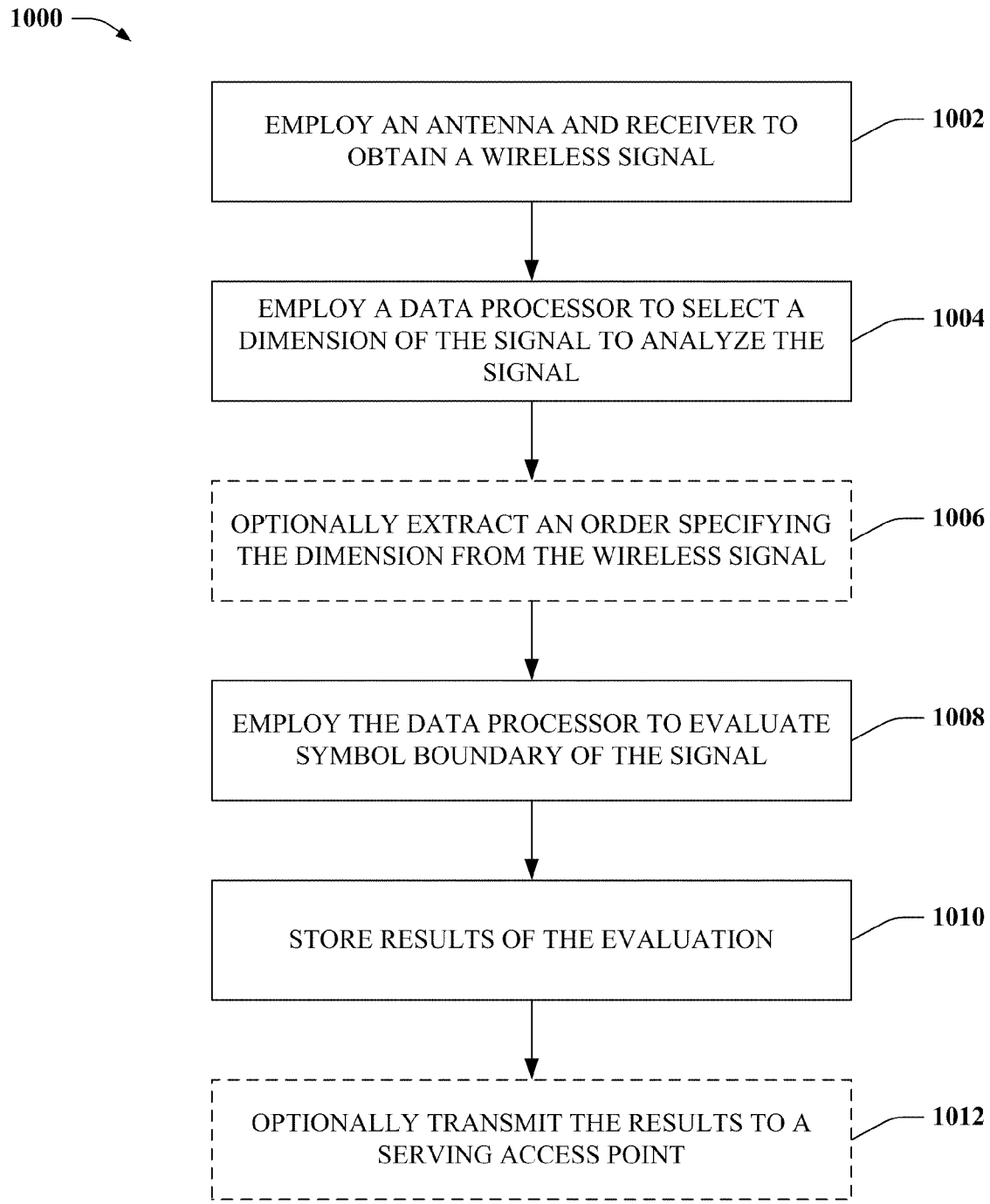
FIG. 10 depicts a flowchart of a sample methodology for facilitating timing analysis in wireless communications according to additional aspects.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 8 depicts a flowchart of an example methodology 800 for providing quality control in wireless signal communications. At 802, method 800 can employ a data processor to track a signal boundary of a wireless signal based on a characteristic of the signal. The signal boundary can be associated with any suitable division of the wireless signal, such as a time division (e.g., signal frame, sub-frame, OFDM symbol), frequency division (e.g., data band, tone, frequency boundary), or the like. Additionally, the signal characteristic can comprise a CP, frequency or CIR estimate, or other suitable measurable signal characteristic.

At 804, method 800 can employ the data processor to verify the signal boundary based on a different characteristic of the wireless signal. Specifically, if tracking at reference number 802 employs a first signal characteristic, verifying at reference number 804 employs a second signal characteristic, different from the first. In at least one aspect of the subject disclosure, the second signal characteristic can be selected to overcome shortcomings associated with the first signal characteristic. As an example, if a characteristic or channel employed for tracking at reference number 802 has a low pull-in range, a dimension of the wireless signal resulting in higher pull-in range can be employed for verification. At 806, method 800 can store results of the tracking or verifying in memory, to facilitate additional analysis, correction of identified errors, or the like.

FIG. 9 illustrates a flowchart of a sample methodology 900 for determining and correcting signal timing in wireless communications. At 902, method 900 can execute a first algorithm to track timing of a wireless signal. The first algorithm can comprise an algorithm based on a suitable dimension of the wireless signal. At 904, method 900 can obtain timing information as a result of the first algorithm. At 906, method 900 can identify a second algorithm to verify signal timing of the wireless signal.

At 908, method 900 can optionally determine whether verification should be done via a local processor or remote processor. The determination can be based on processor load balancing, interference conditions, or wireless conditions particular to the local or remote processor. If the verification is to be conducted remotely, method 900 proceeds to 910, where a user equipment (UE) can optionally be instructed to execute a second algorithm to verify timing of the wireless signal. At 912, method 900 can optionally obtain results of the timing verification from the UE, and proceed to 918.

If, at reference number 908, the optional determination selects local processing, or the determination is not conducted, method 900 proceeds to 914. At 914, method 900 can execute the second algorithm to verify the signal timing, as described herein. At 916, method 900 can collect verification output data. At 918, method 900 can compare timing of the first or second algorithms with a reference timing. At 920, method 900 can determine whether correction is required based on the comparison. At 922, method 900 can identify a suitable timing correction based at least on the verification output. At 924, the timing correction can be implemented at a subsequent cycle or sub-cycle of the wireless signal.

FIG. 10 depicts a flowchart of a sample methodology 1000 for facilitating improved timing analysis in wireless communications. At 1002, method 1000 can employ an antenna and a receiver to obtain and decode a wireless signal. At 1004, method 1000 can employ a data processor to select a dimension of the signal to analyze signal timing information. The dimension can comprise one of signal phase correlation, symbol boundary or sub-slot correlation or signal CP correlation. Additionally, selecting the dimension can further comprise extracting a command from the decoded wireless signal (e.g., that specifies the dimension for selection) and selecting the signal dimension in accordance with the command. At 1006, method 1000 can optionally extract an order from the wireless signal or a related wireless signal, specifying which signal dimension to employ for the analysis. At 1008, method 1000 can employ the data processor to evaluate symbol boundary timing of the wireless signal. At 1010, method 1000 can store results of the evaluation. At 1012, method 1000 can optionally transmit the results to a serving access point to facilitate identifying or correcting timing errors for the wireless signal.

Figure 11:
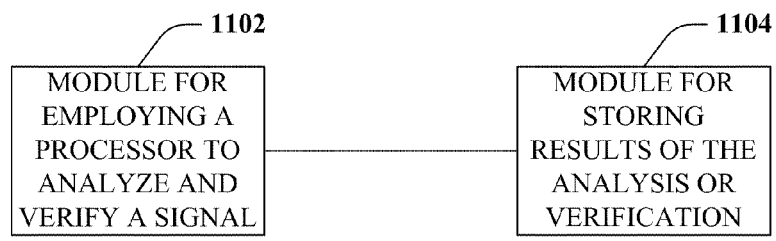
FIGS. 11 and 12 depict block diagrams of sample systems that implement and facilitate, respectively, improved timing analysis in wireless systems.
Figure 12:
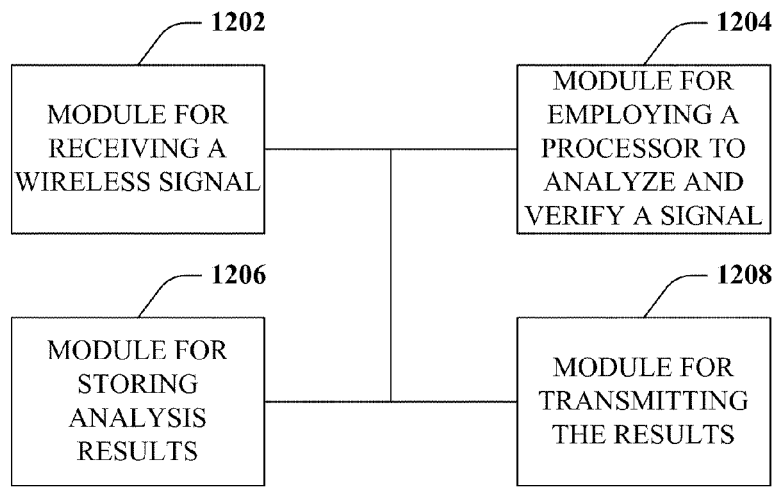

FIGS. 11 and 12 illustrate example systems 1100, 1200 for implementing and facilitating, respectively, improved timing analysis in wireless communications according to aspects of the subject disclosure. For example, systems 1100 and 1200 can reside at least partially within a wireless communication network and/or within a transmitter such as a node, base station, access point, user terminal, personal computer coupled with a mobile interface card, or the like. It is to be appreciated that systems 1100 and 1200 are represented as including functional blocks, which can be functional blocks that represent functions implemented by a processor, software, or combination thereof (e.g., firmware).

System 1100 can comprise a module 1102 for employing a data processor to analyze and verify timing information of a wireless signal. The module 1102 can employ a first algorithm based on a first aspect of the wireless signal to track signal timing information. Additionally, the module 1102 can employ a second algorithm based on a second aspect of the wireless signal to verify the signal timing information. Specifically, the second aspect of the wireless signal can be different from the first aspect of the wireless signal, and can be selected to mitigate deficiency of the first aspect. Further to the above, system 1100 can comprise a module 1104 for storing results of the analysis or the verification. Stored information can be employed to identify errors in timing and correct those errors, as described herein.

System 1200 can comprise a module 1202 for receiving a wireless signal. The module 1202 can comprise, for instance, a wireless antenna and receiver for demodulating and decoding wireless symbols. Additionally, system 1200 can comprise a module 1204 for employing a data processor to analyze and verify timing information of the wireless signal, respectively employing different aspects of such signal, as described herein. Further, system 1200 can comprise a module 1206 for storing results of the analysis and verification. Moreover, system 1200 can comprise a module 1208 for transmitting the results to a serving access point, to facilitate identification and correction of timing errors.

Figure 13:
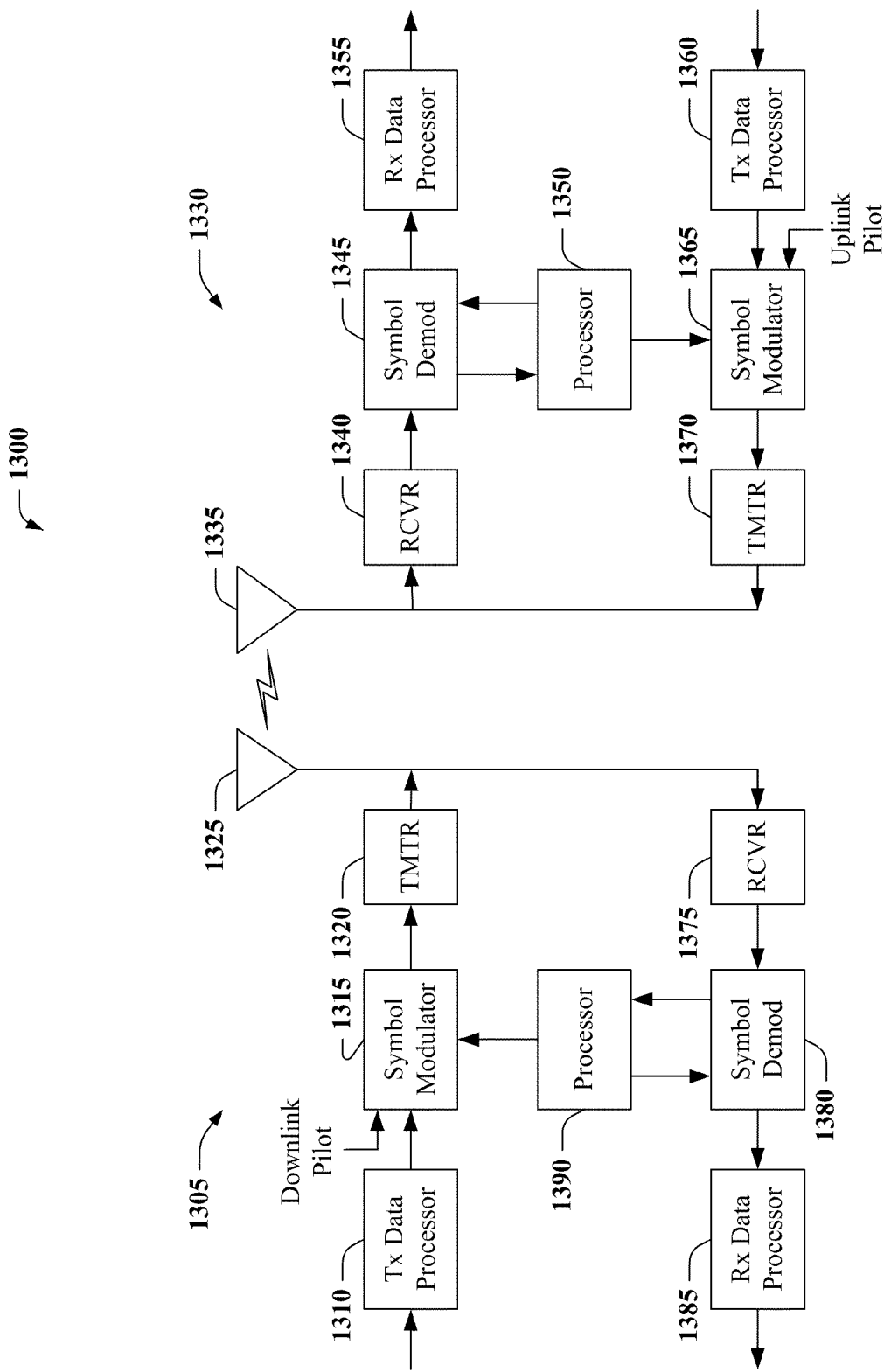
FIG. 13 depicts a block diagram of an example wireless communications apparatus employed in implementing various aspects of the subject disclosure.

FIG. 13 depicts a block diagram of an example system 1300 that can facilitate wireless communication according to some aspects disclosed herein. On a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1320 multiplexes data and pilot symbols and provides them to a transmitter unit (TMTR) 1320. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305. Specifically, the uplink signal can be in accordance with SC-FDMA requirements and can include frequency hopping mechanisms as described herein.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and time-based impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1390 and 1350.

Figure 14:
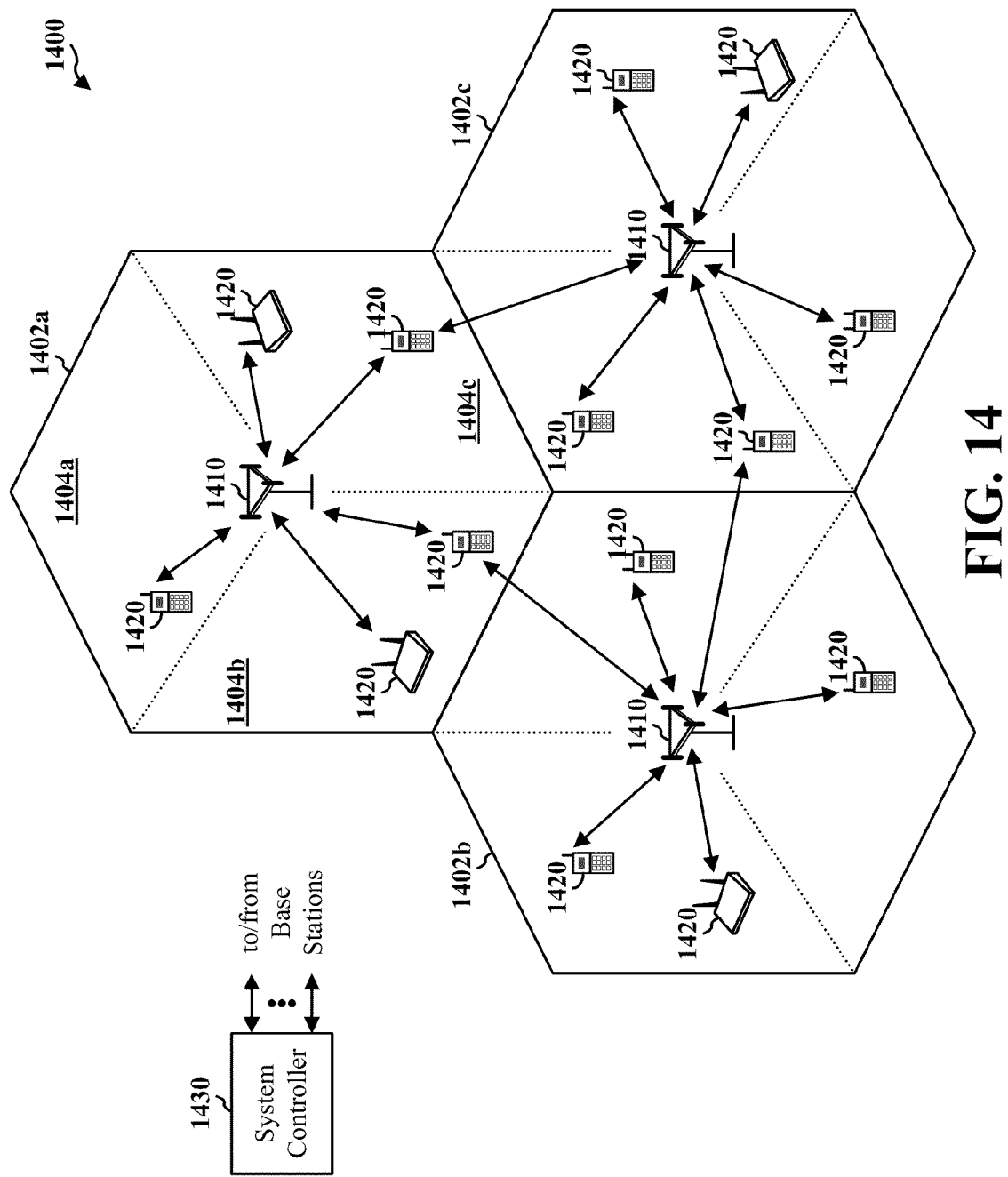
FIG. 14 depicts a block diagram of a sample cellular environment for wireless communications according to further aspects.

FIG. 14 illustrates a wireless communication system 1400 with multiple base stations (BSs) 1410 (e.g., wireless access points, wireless communication apparatus) and multiple terminals 1420 (e.g., ATs), such as can be utilized in conjunction with one or more aspects. A BS (1410) is generally a fixed station that communicates with the terminals and can also be called an access point, a Node B, or some other terminology. Each BS 1410 provides communication coverage for a particular geographic area or coverage area, illustrated as three geographic areas in FIG. 14, labeled 1402a, 1402b, and 1402c. The term "cell" can refer to a BS or its coverage area depending on the context in which the term is used. To improve system capacity, a BS geographic area/coverage area can be partitioned into multiple smaller areas (e.g., three smaller areas, according to cell 1402a in FIG. 14), 1404a, 1404b, and 1404c. Each smaller area (1404a, 1404b, 1404c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with unsectorized cells. For simplicity, in the subject description, unless specified otherwise, the term "base station" is used generically for a fixed station that serves a sector as well as a fixed station that serves a cell.

Terminals 1420 are typically dispersed throughout the system, and each terminal 1420 can be fixed or mobile. Terminals 1420 can also be called a mobile station, user equipment, a user device, wireless communication apparatus, an access terminal, a user terminal or some other terminology. A terminal 1420 can be a wireless device, a cellular phone, a personal digital assistant (PDA), a wireless modem card, and so on. Each terminal 1420 can communicate with zero, one, or multiple BSs 1410 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1430 couples to base stations 1410 and provides coordination and control for BSs 1410. For a distributed architecture, BSs 1410 can communicate with one another as needed (e.g., by way of a wired or wireless backhaul network communicatively coupling the BSs 1410). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 15:
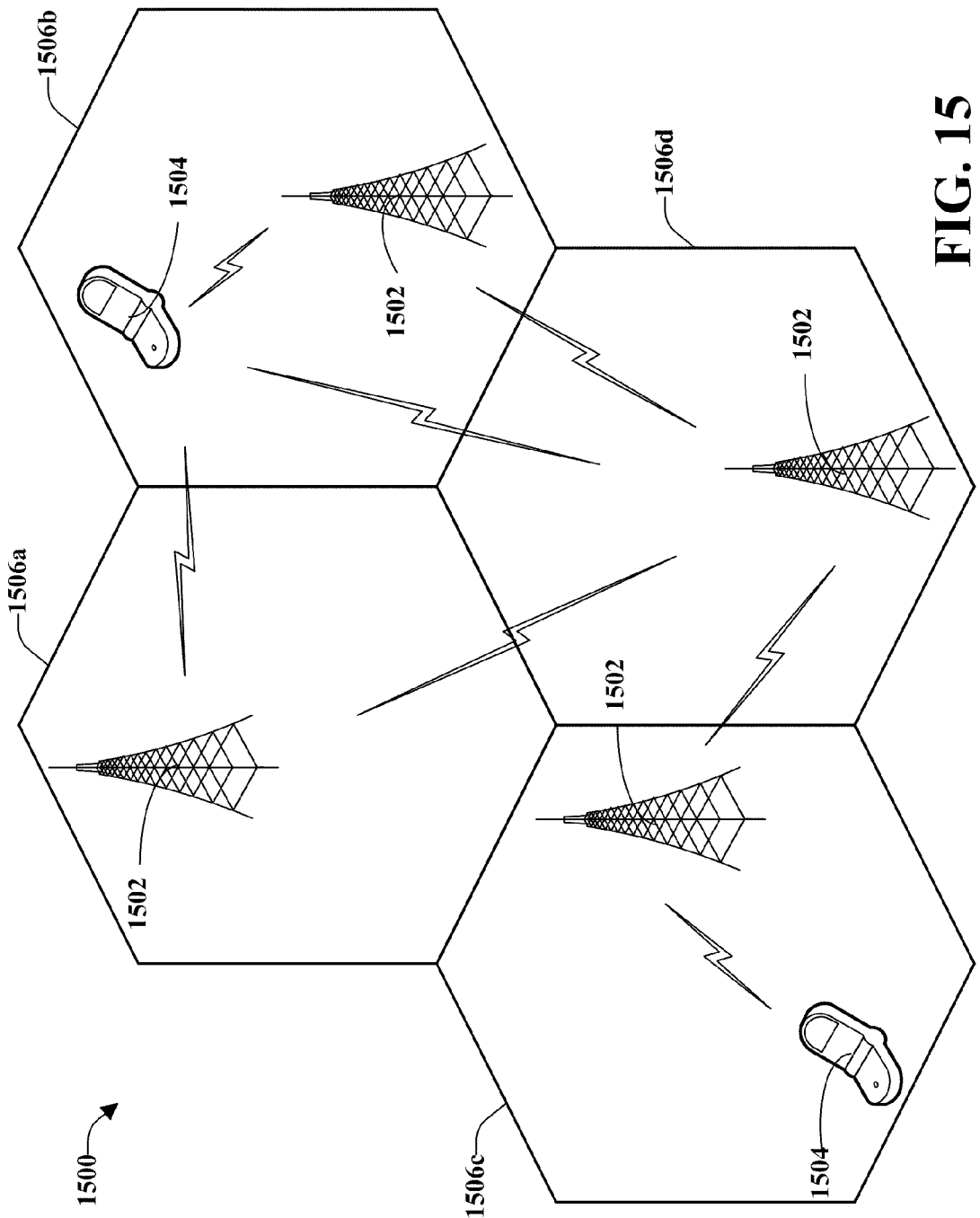
FIG. 15 illustrates a block diagram of an example wireless signaling environment for wireless communications.

FIG. 15 is an illustration of a planned or semi-planned wireless communication environment 1500, in accordance with various aspects. System 1500 can comprise one or more BSs 1502 in one or more cells and/or sectors that receive, transmit, repeat, etc., wireless communication signals to each other and/or to one or more mobile devices 1504. As illustrated, each BS 1502 can provide communication coverage for a particular geographic area, illustrated as four geographic areas, labeled 1506a, 1506b, 1506c and 1506d. Each BS 1502 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 5), as will be appreciated by one skilled in the art. Mobile devices 1504 can be, for example, cellular phones, smart phones, laptops, handheld communication devices, handheld computing devices, satellite radios, global positioning systems, PDAs, or any other suitable device for communicating over wireless network 1500. System 1500 can be employed in conjunction with various aspects described herein in order to facilitate improved timing management in wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communications, comprising:
employing a data processor to execute the following instructions: tracking a signal boundary of an orthogonal frequency division multiplex (OFDM) wireless signal with a tracking function that is based on a characteristic of at least one tone of a plurality of tones of a first channel of the OFDM wireless signal, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths;
verifying the signal boundary of the tracking function with an additional function that is based on a different characteristic of at least one tone of a plurality of tones of a second channel of the OFDM wireless signal, the second channel being different from the first channel, and wherein the second channel is a synchronization signal channel, and wherein the plurality of tones of the synchronization signal channel have a frequency spacing less than the frequency spacing of the plurality of tones of the reference signal channel; and
storing results of the tracking or the verifying in memory.

2. The method of claim 1, further comprising using two of: cyclic prefix, frequency, or time as the characteristic of the at least one tone of the first channel and as the different characteristic of the at least one tone of the second channel, respectively.

3. The method of claim 1, further comprising using a time domain algorithm that estimates channel impulse response (CIR) of pilot signal tones of the wireless signal for the tracking function to track timing of the at least one tone of the first channel.

4. The method of claim 3, wherein the time domain algorithm uses a reference signal (RS) of the at least one tone of the first channel for CIR estimation.

5. The method of claim 1, further comprising using a cyclic prefix algorithm that cross-correlates a cyclic prefix of an OFDM symbol with a copy of the cyclic prefix for the tracking function to track timing of the at least one tone of the first channel.

6. The method of claim 1, further comprising using a frequency domain algorithm that employs a phase differential between adjacent pilot tones of the wireless signal for the tracking function to track timing of the at least one tone of the first channel.

7. The method of claim 1, further comprising using a frequency domain algorithm for the additional function, wherein the plurality of tones of the synchronization signal channel span a plurality of contiguous plurality of frequency bandwidths of the synchronization signal channel, the contiguous plurality of frequency bandwidths spanning a frequency range less than the frequency range of the reference signal channel.

8. The method of claim 1, further comprising using a frequency domain algorithm that tracks a synchronization channel of the at least one tone of the second channel as the additional function to verify the signal boundary.

9. The method of claim 8, wherein an output of the frequency domain algorithm is used to identify whether the tracking function is accurate or inaccurate.

10. The method of claim 8, wherein the output of the frequency domain algorithm for normal cyclic prefix is one of a set {0, +offset, −offset}, where 0 indicates the tracking function output is accurate, and +/−offset indicate that the output is early/late, respectively, by an offset magnitude.

11. The method of claim 8, wherein the output of the frequency domain algorithm for extended cyclic prefix is one of a set {0, +short offset, −short offset, +long offset, −long offset}, where short/long offset indicate that the output is incorrect in time by a Relatively small or large, respectively, offset magnitude.

12. The method of claim 1, further comprising correcting a received signal timing if a result of verifying the signal boundary indicates a timing error.

13. The method of claim 12, further comprising forwarding a correction factor to a source of the OFDM wireless signal to facilitate timing correction at the source.

14. An apparatus for wireless communications, comprising:
a data processor configured to execute a plurality of modules configured to track a signal dimension of a wireless signal, the plurality of modules comprising memory storing instructions to be executed by the data processor, processor circuitry, or both:
a tracking module configured to use a primary algorithm to monitor a signal boundary based on a first characteristic of at least one tone of a plurality of tones of a first channel of an orthogonal frequency division multiplex (OFDM) wireless signal, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths;
a verification module configured to use a secondary algorithm to validate output of the primary algorithm based on a second characteristic of at least one tone of a plurality of tones of a second channel of the OFDM wireless signal, the second channel being different from the first channel and wherein the second channel is a synchronization signal channel, and wherein the plurality of tones of the synchronization signal channel have a frequency spacing less than the frequency spacing of the plurality of tones of the reference signal channel; and
a memory configured to store output of the primary algorithm or secondary algorithm.

15. The apparatus of claim 14, further comprising a comparison module configured to evaluate output of the primary or secondary algorithm with respect to a default signal boundary in determining accuracy of the signal dimension.

16. The apparatus of claim 14, wherein the signal dimension comprises signal timing and the signal boundary comprises an OFDM symbol boundary.

17. The apparatus of claim 14, further comprising a corrections module configured to adjust the signal dimension of the OFDM wireless signal in accordance with the output of the primary or secondary algorithms and optionally forwards data indicative of the adjustment to a source of the OFDM wireless signal.

18. The apparatus of claim 14, further comprising a series parsing module configured to analyze cyclic prefixes of the OFDM wireless signal if the first characteristic or second characteristic analyzed by the primary or secondary algorithm includes cyclic prefix.

19. The apparatus of claim 14, further comprising a spectral analysis module configured to evaluate phase differential between pilot or reference signal tones of the OFDM wireless signal if the first characteristic or second characteristic analyzed by the primary or secondary algorithm includes frequency.

20. The apparatus of claim 14, further comprising a timing module configured to perform reference signal channel impulse response (CIR) estimation if the first characteristic or second characteristic analyzed by the primary or secondary algorithm includes time.

21. The apparatus of claim 14, wherein the primary algorithm is a time tracking loop (TTL) function based on cyclic prefix, frequency or time-based impulse response of the OFDM wireless signal.

22. The apparatus of claim 14, wherein the primary algorithm comprises a CIR estimate of reference signal (RS) tones of the first channel and the secondary algorithm comprises a frequency domain analysis of a secondary synchronization signal (SSS) of the second channel.

23. The apparatus of claim 14, further comprising a results module configured to output data generated by the secondary algorithm, wherein the data indicates whether the primary algorithm reports accurate or inaccurate timing.

24. The apparatus of claim 23, wherein the results module is configured to output a different set of output data for the secondary algorithm, wherein the output data indicates an offset in OFDM symbol boundary for a normal cyclic prefix wireless signal, or indicates varying degrees of offset in OFDM symbol boundary for extended cyclic prefix wireless signal.

25. An apparatus for wireless communications, comprising:
means for tracking a signal boundary of an orthogonal frequency division multiplex (OFDM) wireless signal with a tracking function that is based on a characteristic of at least one tone of a plurality of tones of a first channel of the OFDM wireless signal, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths;
means for verifying the signal boundary of the tracking with an additional function that is based on a different characteristic of at least one tone of a plurality of tones of a second channel of the OFDM wireless signal, the second channel being different from the first channel, and wherein the second channel is a synchronization signal channel, and wherein the plurality of tones of the synchronization signal channel have a frequency spacing less than the frequency spacing of the plurality of tones of the reference signal channel; and
means for storing results of the tracking or the verifying in memory.

26. At least one processor configured for wireless communications, comprising:
a module for tracking a signal boundary of an orthogonal frequency division multiplex (OFDM) wireless signal with a tracking function that is based on a characteristic of at least one tone of a plurality of tones of a first channel of the OFDM wireless signal, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths, the module comprising memory storing instructions to be executed by the processor, processor circuitry, or both; and an additional module for verifying the signal boundary of the tracking function with an additional function that is based on a different characteristic of at least one tone of a plurality of tones of a second channel of the OFDM wireless signal, and wherein the second channel is a synchronization signal channel, and wherein the plurality of tones of the synchronization signal channel have a frequency spacing less than the frequency spacing of the plurality of tones of the reference signal channel, the second channel being different from the first channel, the additional module comprising memory storing instructions to be executed by the processor, processor circuitry, or both.

27. A computer program product, comprising:
a non-transitory computer-readable medium having non-transitory program code recorded thereon, the program code comprising:
program code to track a signal boundary of an orthogonal frequency division multiplex (OFDM) wireless signal with a tracking function that is based on a characteristic of at least one tone of a plurality of tones of a first channel of the OFDM wireless signal, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths; and
program code to verify the signal boundary of the tracking function with an additional function that is based on a different characteristic of at least one tone of a plurality of tones of a second channel of the OFDM wireless signal, and wherein the second channel is a synchronization signal channel, and wherein the plurality of tones of the synchronization signal channel have a frequency spacing less than the frequency spacing of the plurality of tones of the reference signal channel, the second channel being different from the first channel.

28. A method of facilitating wireless communications, comprising:
employing an antenna and receiver to obtain and decode a wireless signal and output a decoded wireless signal;
employing a data processor to execute the following instructions:
selecting a first dimension of the wireless signal to analyze the wireless signal;
evaluating a symbol boundary of at least one tone of a plurality of tones of a first channel of the wireless signal based on a function of the selected first signal dimension, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths;
verifying the evaluation with a function of a second dimension of at least one tone of a plurality of tones of a second channel of the wireless signal, wherein the second dimension is different from the first dimension, and wherein the second channel is a synchronization signal channel, and wherein the plurality of tones of the synchronization signal channel have a frequency spacing less than the frequency spacing of the plurality of tones of the reference signal channel; and
correcting received signal timing if the evaluation or verification indicates a timing error.

29. The method of claim 28, further comprising extracting a command from the decoded wireless signal and selecting the signal dimension in accordance with the command.

30. The method of claim 28, wherein the signal dimension is one of cyclic prefix, frequency, or time-based CIR.

31. The method of claim 28, wherein the symbol boundary comprises OFDM symbol timing and the function comprises a frequency-based analysis of a secondary synchronization signal (SSS) of the wireless signal.

32. The method of claim 31, wherein results of the frequency-based SSS analysis are employed to correct pull-in errors resulting from the symbol boundary evaluation.

33. An apparatus for facilitating wireless communications, comprising:
a wireless antenna and a receiver configured to receive the wireless signal;
a decoding module configured to decode, and configured to identify an order within the received wireless signal, wherein the order specifies an element of the wireless signal, the decoding module comprising memory storing instructions, processor circuitry, or both;
a data processor configured to execute a plurality of modules for analyzing the decoded signal, the plurality of modules comprising memory storing instructions, processor circuitry, or both:
an analysis module configured to identify the element of the wireless signal to evaluate the wireless signal; and
an execution module configured to calculate timing data of the wireless signal, wherein the timing data comprises an OFDM symbol boundary, wherein the execution module employs an algorithm based on the identified element to calculate timing data of the wireless signal, and wherein the algorithm is a frequency-based analysis of a synchronization channel of the wireless signal, wherein the frequency-based analysis detects timing errors larger than pull-in range limitations of timing functions employed by an access point of a serving wireless network; and
a transmitter configured to submit the timing data to the access point to assist the serving wireless network in verifying timing for the wireless signal.

34. The apparatus of claim 33, wherein the element of the wireless signal is frequency, time or cyclic prefix.

35. An apparatus for facilitating wireless communications, comprising:
means for employing an antenna and receiver to obtain and decode a wireless signal and output a decoded signal;
means for selecting a first dimension of the wireless signal to analyze the wireless signal;
means for evaluating a symbol boundary of at least one tone of a plurality of tones of a first channel of the wireless signal based on a function of the selected first signal dimension, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths;

means for verifying the evaluation with a function of a second dimension of at least one tone of a plurality of tones of a second channel of the wireless signal, wherein the second dimension is different from the first dimension, and wherein the second channel is a synchronization signal channel, and wherein the plurality of tones of the synchronization signal channel have a frequency spacing less than the frequency spacing of the plurality of tones of the reference signal channel; and means for correcting received signal timing if the evaluation or verification indicates a timing error.

36. At least one processor configured to facilitate wireless communications, comprising a plurality of modules to be executed by the at least one processor, each of the plurality of modules comprising memory storing instructions to be executed by the at least one processor, processor circuitry, or both, the plurality of modules comprising:

a first module for obtaining and decoding a wireless signal and output a decoded signal;

a second module for selecting a first dimension of the wireless signal to analyze the decoded signal;

a third module for evaluating symbol boundary of at least one tone of a plurality of tones of a first channel of the wireless signal based on a function of the selected first signal dimension, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths, and verifying the evaluation with a function of a second dimension of at least one tone of a plurality of tones of a second channel of the wireless signal, wherein the second dimension is different from the first dimension, and wherein the second channel is a synchronization signal channel, and wherein the plurality of tones of the synchronization signal channel have a frequency spacing less than the frequency spacing of the plurality of tones of the reference signal channel; and a fourth module for correcting received signal timing if the evaluation or verification indicates a timing error.

37. A computer program product, comprising:

a non-transitory computer-readable medium having non-transitory program code recorded thereon, the program code comprising:

program code to obtain and decode a wireless signal and output a decoded signal;

program code to select a first dimension of the wireless signal to analyze the decoded signal;

program code to evaluate a symbol boundary of at least one tone of a plurality of tones of a first channel of the wireless signal based on a function of the selected first signal dimension, wherein the first channel is a reference signal channel having a frequency range consisting of a plurality of frequency bands each having a frequency bandwidth, and wherein the plurality of tones of the reference signal channel span the frequency range of the reference signal channel and have a frequency spacing of two or more frequency bandwidths, and verifying the evaluation with a function of a second dimension of at least one tone of a plurality of tones of a second channel of the wireless signal, wherein the second dimension is different from the first dimension, and wherein the second channel is a synchronization signal channel, and wherein the plurality of tones of the synchronization signal channel have a frequency spacing less than the frequency spacing of the plurality of tones of the reference signal channel; and program code to correct received signal timing if the evaluation or verification indicates a timing error.

* * * * *